US012664142B2

(12) United States Patent
Smith

(10) Patent No.: US 12,664,142 B2
(45) Date of Patent: Jun. 23, 2026

(54) HIERARCHICAL SCRIPT DATABASE AND DATABASE APPLICATIONS

(71) Applicant: Kyle MacLean Smith, Victoria (CA)

(72) Inventor: Kyle MacLean Smith, Victoria (CA)

( * ) Notice: Subject to any disclaimer, the term of this patent is extended or adjusted under 35 U.S.C. 154(b) by 472 days.

(21) Appl. No.: 17/424,316

(22) PCT Filed: Jan. 28, 2020

(86) PCT No.: PCT/US2020/015456
§ 371 (c)(1),
(2) Date: Jul. 20, 2021

(87) PCT Pub. No.: WO2020/160021
PCT Pub. Date: Aug. 6, 2020

(65) Prior Publication Data
US 2022/0156240 A1 May 19, 2022

Related U.S. Application Data

(60) Provisional application No. 62/798,801, filed on Jan. 30, 2019.

(51) Int. Cl.
*G06F 16/22* (2019.01)
*G06F 16/23* (2019.01)
*G06F 16/28* (2019.01)
(52) U.S. Cl.
CPC ...... *G06F 16/2246* (2019.01); *G06F 16/2358* (2019.01); *G06F 16/282* (2019.01)
(58) Field of Classification Search
None
See application file for complete search history.

(56) References Cited

U.S. PATENT DOCUMENTS

| | | | |
|---|---|---|---|
| 6,549,944 B1 | 4/2003 | Weinberg et al. | |
| 2004/0249830 A1* | 12/2004 | Sonkin | G06F 9/45512 |
| 2013/0055210 A1 | 2/2013 | Murthy et al. | |
| 2013/0318495 A1 | 11/2013 | Gardner | |
| 2014/0012963 A1* | 1/2014 | Swenson | H04L 41/0813 |
| | | | 709/220 |
| 2014/0129517 A1 | 5/2014 | Cotichini et al. | |
| 2016/0078118 A1* | 3/2016 | Abla | G06F 17/10 |
| | | | 707/736 |
| 2017/0310552 A1* | 10/2017 | Wallerstein | H04L 41/22 |
| 2017/0322732 A1* | 11/2017 | Lissone | G06F 3/0673 |
| 2023/0060787 A1* | 3/2023 | Mason | G06F 8/24 |

OTHER PUBLICATIONS

International Search Report and Written Opinion for PCT/US2020/015456 mailed Apr. 28, 2020, 10 pages.

* cited by examiner

*Primary Examiner* — Dawaune A Conyers
(74) *Attorney, Agent, or Firm* — Klarquist Sparkman, LLP

(57) ABSTRACT

A tree database includes nodes organized as one or more tree data structures. The nodes contain both function and data properties in the form of script files in an interpreter environment. The database is event-driven. Responsive to an event, a node can spawn a new child node in the tree, which contains a data item associated with the event, enabling the tree database to grow as events and data arrive. Query events, initialization, and purging are also supported. Example applications of a communication appliance, an educational quiz, and a music database are provided.

14 Claims, 20 Drawing Sheets

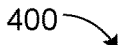
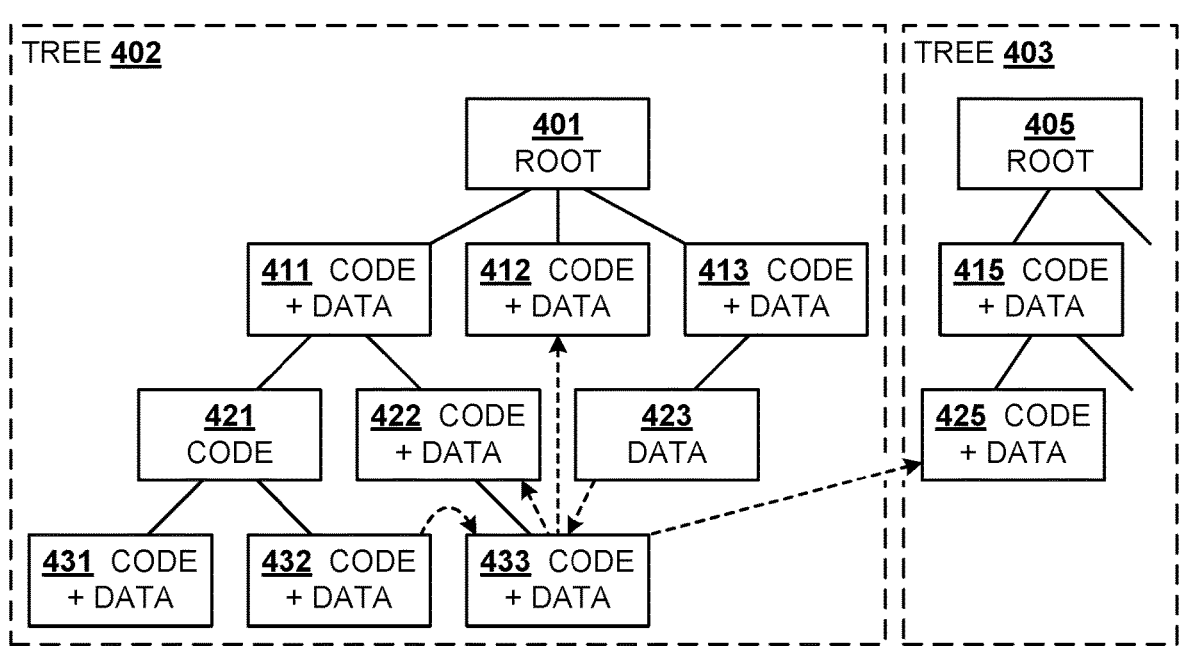
FIG. 4

600

610 WRITE SOFTWARE PROGRAM AS A TREE WHOSE NODES CONTAIN EXECUTABLE CODE AND DATA OF THE SOFTWARE PROGRAM

620 EXECUTE THE SOFTWARE PROGRAM TO RESPOND TO EVENTS AND ADD NODES TO THE TREE

630 EXECUTE THE SOFTWARE PROGRAM TO RESPOND TO QUERIES ON THE TREE

800

810  RECEIVE ROUTED EVENT WITH DATA ITEM

820  FORMAT DATA ITEM

830  CONSTRUCT CHILD WITH DATA ITEM

840  CALL KERNEL WITH PARAMETERS

850  ASSIGN ADDRESS OF CHILD AND (OPTIONALLY) PARENT

860  IN PARENT, ADD LINK TO CHILD

870  FORMAT CHILD AS SCRIPT

880  SAVE CHILD SCRIPT FILE

890  PERFORM FURTHER APPLICATION-SPECIFIC EVENT HANDLING

1200

1210 RECEIVE EVENT AT EVENT HANDLER VERTEX OF TREE DATABASE, THE EVENT HAVING A NEW DATA ITEM

1220 ADD NEW VERTEX TO THE TREE DATABASE, WITH SCRIPT HAVING NEW DATA ITEM DEFINED AS A DATA PROPERTY

1230 UPDATE EVENT HANDLER METADATA TO LINK EVENT HANDLER VERTEX TO NEW VERTEX

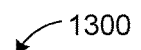

```
./kernel/Version2020-01-21.json

LINE
1326   function syn() {
1327      function feedback( $0, $1 ) {
1328         _0.log(
1329            'warn'
1330            , $1 + '\nparent: ' + _0.inspect( _1.parent, _1.inspectSettings )
1331               + '\nchild: ' + _0.inspect( $0, _1.inspectSettings )
1332            , _1
1333         )
1334      }

1335      function update( $0, $1 ) {
1336         if ( $1 == '$0' ) { return; }
1337         if ( _1.parent[ $1 ] === null ) { _1.parent[ $1 ] = $0[ $1 ]; }
1338         else if (
1339            _1.option && _1.option.indexOf( 'o' ) > -1
1340               && typeof _1.parent[ $1 ] == 'undefined'
1341         ) { _1.parent[ $1 ] = $0[ $1 ]; }
1342         else if ( typeof _1.parent[ $1 ] == 'undefined' ) {
1343            _1.feedback( $0, 'parent undefined\nkey: ' + $1 );
1344         }
1345         else if ( _1.option && _1.option.indexOf( 'n' ) > -1 ) {
1346            _1.parent[ $1 ] = $0[ $1 ];
1347         }
1348         else { _1.feedback( $0, 'parent not null\nkey: ' + $1 ); }
1349      }

1350      const _1 = _0.tie( _0, _0.syn, new _Syn, new Syn( ... arguments ) )
1351      ; _1.children.forEach( $0 => {
1352         if ( typeof $0 == 'object' ) {
1353            Object.keys( $0 ).forEach( $1 => { _1.update( $0, $1 ); } )
1354            ; return;
1355         }
1356         _1.feedback( $0, 'child not object' );
1357      } )
1358      ; return _1.parent;
```

LINE
1359      function _Syn() {
1360          this.$0 = {}; this.$0.id = _0.syn.name; this.$0.loci =  _0.id
1361          ; this.$0.record = false; this.$0.show = false;
1362      }

1363      function Syn( $0 ) {
1364          this.feedback = feedback
1365          ; this.inspectSettings = { colors: true, depth: 0, showHidden: false }
1366          ; this.last = {}
1367          ; this.last.value = arguments[ arguments.length - 1 ]
1368          ; this.last.option = typeof this.last.value == 'string' ? true : false
1369          ; this.children = this.last.option ?
1370              Array.apply( null, arguments ).splice( 1, arguments.length - 2 )
1371              : Array.apply( null, arguments ).splice( 1 )
1372          ; this.option = this.last.option ? this.last.value : false
1373          ; this.parent = $0; this.update = update;
1374      }
1375  }
```

```
./kernel/Version2020-01-21.json

LINE
1416 function tie() {
1417  function put( $0, $1, $2 ) {
1418    Object.keys( $1 ).forEach( $3 => {
1419      if ( typeof $0[$3] == 'undefined' ) {
1420        Object.defineProperty( $0, $3, {
1421          configurable: true, enumerable: $2, value: $1[ $3 ], writable: true
1422        } );
1423      }
1424    } )
1425    ; return $1;
1426  }

1427  if ( ! _0.tie.$0 ) {
1428    put( _0.tie, { $0: ( new _Tie ).$0 }, ( new _Tie ).$0.show )
1429    ; put( _0.tie, new _Tie, true );
1430  }
1431  _0.tie.$0.click ++
1432  ; const _1 = new _0.tie.Tie( ... arguments )
1433  ; _1.put( _1, { $0: new _0.tie.Meta( _0.tie ) }, _0.tie.$0.show )
1434  ; _1.put( _1.$0, new _0.tie.MetaLocal( _0.tie ), true );
1435  if ( _0.tie.$0.record ) {
1436    _1.put( _0.tie, { [ '$' + _0.tie.$0.click ]: _1 }, _0.tie.$0.show );
1437  }
1438  if ( ! _1.child.$0 ) {
1439    _1.put( _1.child, { $0: new _0.tie.Meta( _1.parent ) }, _1.show );
1440    if ( _1.global.$0 ) { _1.put( _1.child.$0, _1.global.$0, true ); }
1441    _1.put( _1.child.$0, new _0.tie.MetaGlobal( _1.parent, _1.child ), true )
1442    ; _1.put( _1.child, _1.global, true );
1443  }
1444  _1.child.$0.click ++
1445  ; _1.put( _1.local, { $0: new _0.tie.Meta( _1.child ) }, _1.show )
1446  ; _1.put( _1.local.$0, new _0.tie.MetaLocal( _1.child, _1.parent ), true );
1447  if ( _1.child.$0.record ) {
1448    _1.put( _1.child, { [ '$' + _1.child.$0.click ]: _1.local }, _1.show );
1449  }
1450  return _1.local;
```

```
       (>>continued)
LINE
1451   function Meta( $0 ) {
1452     this.date = new Date; this.parent = $0; this.time =
this.date.toLocaleString();
1453   }

1454   function MetaGlobal( parent, child ) {
1455     this.click = 0; this.record = true; this.show = true;
1456     if ( typeof parent != 'undefined' ) {
1457       this.id = parent == child ? 'parent' : child.name
1458       ; this.loci = parent == child ? 'x.$0'
1459         : typeof parent == 'string' ? _0.id + '.$0'
1460         : parent.$0.loci + ( parent.$0.loci ? '.' : '' ) + parent.$0.id;
1461     }
1462   }
1463   function MetaLocal( child, parent ) {
1464     if ( child == parent ) {
1465       this.id = _0.id; this.loci = ''; this.seed = seed;
1466     } else {
1467       this.id = '$' + child.$0.click; this.loci = child.$0.loci + '.' + child.$0.id;
1468     }
1469   }

1470   function _Tie() {
1471     this.$0 = new Meta( _0.local ); this.$0.id = _0.tie.name; this.$0.loci =
_0.id
1472     ; this.$0.record = false; this.$0.show = true
1473     ; put( this.$0, new MetaGlobal, true )
1474     ; this.Meta = Meta; this.MetaGlobal = MetaGlobal; this.MetaLocal =
MetaLocal
1475     ; this.seed = seed; this.Tie = Tie;
1476   }

1477   function Tie( $0, $1, $2, $3 ) {
1478     this.child= $1; this.global = $2; this.local = $3; this.parent = $0 ? $0 : $1
1479     ; this.put = put
1480     ; this.show = $1.$0 ? $1.$0.show : $2.$0
1481       && typeof $2.$0.show == 'boolean' ?
1482       $2.$0.show : ( new _0.tie.MetaGlobal ).show;
1483   }
1484 }
```

FIG. 14B

```
./rootQuiz/parent/child_1/2020-01-21T19-56-13.182Z.json

LINE
1550 {
1551     "question": "moon%20distance%20from%20earth",
1552     "answer": "385077 km (kilometers)",
1553     "filesystemAddress": "./rootQuiz/parent/child_1",
1554     "$0": {
1555        "date": "2020-01-21T19:56:13.182Z",
1556        "time": "1/21/2020, 11:56:13 AM",
1557        "id": "#1",
1558        "scope": "rootQuiz.parent"
1559     }
1560 }

./rootQuiz/parent/child_1/2020-01-21T19-56-13.182Z.js

1510 {
1520     function isAnswerCorrect($0) {...}
1530     function getParent( ) {...}
1540 }
```

```
./rootQuiz/parent/2020-01-21T19-56-13.182Z.json

LINE
1650 {
1651   "$0": {
1652     "date": "2020-01-21T19-56-13.182Z",
1653     "id": "#1",
1654     "scope": "rootQuiz",
1655     "numberOfChildren: "1"
1656   },
1657   "Q1": {
1658     "question": "moon%20distance%20from%20earth",
1659     "namespaceAddress": "rootQuiz.parent.#1",
1660   }
1661 }

./rootQuiz/parent/2020-01-21T19-25-23.218Z.js

1610  {
1620    function makeChild( $0 ) { ... }
1630    function displayPrompt ( $0 ) { ... }
1640  }
```

```
./rootQuiz/parent/2020-01-21T22-45-41.330Z.json

LINE
1670 {
1671   "$0": {
1672     "date": "2020-01-21T22-45-41.330Z",
1673     "id": "#1",
1674     "scope": "rootQuiz",
1675     "numberOfChildren: "2"
1676   },
1677   "Q1": {
1678     "question": "moon%20distance%20from%20earth",
1679     "namespaceAddress": "rootQuiz.parent.#1",
1680   },
1681   "Q2": {
1682     "question": "mars%20distance%20from%20earth",
1683     "namespaceAddress": "rootQuiz.parent.#2",
1684   }
1685 }

./rootQuiz/parent/2020-01-21T19-25-23.218Z.js

1610   {
1620     function makeChild( $0 ) { ... }
1630     function displayPrompt ( $0 ) { ... }
1640   }
```

HIERARCHICAL SCRIPT DATABASE AND DATABASE APPLICATIONS

CROSS REFERENCE TO RELATED APPLICATIONS

This is the U.S. National Stage of International Application No. PCT/US2020/015456, filed Jan. 28, 2020, which was published in English under PCT Article 21 (2), which in turn claims the benefit of U.S. Provisional Application No. 62/798,801, entitled "NON-HALTING SOFTWARE OBJECTS AND APPLICATIONS," filed Jan. 30, 2019, both of which are incorporated in their entirety herein by reference.

FIELD

This patent application relates to databases and applications thereof.

BACKGROUND

A wide range of computer-based technologies exists for databases and database applications. Yet many existing technologies suffer from lack of transparency, either in the actual data stored, or function implementations, or both. Stakeholders in a database application can find it challenging to verify that the data stored is accurate, or that functions are correctly computed. A great deal of effort and considerable computer and database expertise can be required to perform such verification. Detailed technical documentation may also be required, and other stakeholders (e.g. developers) may be reluctant to disclose requisite detail, preferring to adopt a "trust me!" posture. The lack of transparency also poses a security risk, as malicious tampering can be difficult to detect. Accordingly, there remains a need for database technologies that provide transparent or self-explanatory access to data and functions, and which allow data and functions to be perused and verified by novice stakeholders.

SUMMARY

In summary, the detailed description is directed to various innovative technologies that utilize script for implementation and growth of hierarchically organized data structures, in various combinations.

In certain examples, the disclosed technologies can be implemented as computer-readable media storing a parent script which defines one or more functions of a parent vertex of a tree data structure. The parent script includes executable instructions for instantiating a child vertex of the parent vertex, generating a child script for the child vertex, and forming a link in the parent script identifying or connecting to the child script.

In some examples, the child vertex can be a vertex of the tree data structure. The parent script can include a data property definition or a function property definition of the parent vertex. The child script can include a data property definition or a function property definition of the child vertex. The generating and forming operations can be performed by a kernel module invoked from the parent script. Invoking the kernel module can include passing handles of the parent vertex and the child vertex to the kernel module. Invoking the kernel module can also include passing an identifier of a scope containing the parent vertex. Operations caused by the instructions can include forming a link in the child script identifying or connecting to the parent script.

In further examples, the received event can be associated with a data item, and the generated child script can include a computer-readable representation of the data item. The received event can be a first event, the parent vertex can be a first parent vertex, and a received second event can be processed by a second parent vertex distinct from the first parent vertex. The parent script and the child script can be within distinct respective text files stored in parent and child directories respectively. The child directory can be a subdirectory of the parent directory. The parent script or the child script can include text written in a JavaScript programming language (such as any version of JSON or JavaScript itself).

In certain examples, the disclosed technologies can be implemented as a method. A parent vertex of a tree data structure receives an event from an interface, with the event indicating insertion of a specified data item into the tree data structure. The parent vertex instantiates a new child vertex of the tree data structure to hold the data item, and passes identifiers of the new child vertex and the parent vertex to a kernel function. The kernel function adds metadata to the parent vertex and the new child vertex to link the parent vertex and the new child vertex within the tree data structure.

In some examples, the new child vertex can include the specified data item, and can include a child script. In other examples, the new child vertex can include a child script and can include a link to the specified data item. The linked new data item can be stored in a separate file from the child script. The linked new data item can be a binary file.

In additional examples, data of a communication appliance can be maintained in the tree data structure. The received event can be an incoming communication or a request to initiate an outgoing communication. Further, a second event can be received corresponding to a search function, a billing function, or a listing function. The tree data structure can be traversed responsive to the second event.

In further examples, data of a document can be maintained within the tree data structure. The event can be a notification of a first external occurrence to which the document is applicable. Responsive to the notification, a second external occurrence can be initiated from the tree data structure. A second event can be received, corresponding to a query on the tree data structure. In response, a link can be followed from the tree data structure to a second tree data structure representing a reference linked to the document.

In certain examples, the disclosed technologies can be implemented as a method of updating a tree database of a document having associated entities. Vertices of the tree database can store respective portions of the document. An event accompanied by a new data item is received at an event handler vertex within the tree database. The event is one or more of: a definition of a term in the document, an identification of a new entity to be added to the associated entities, or a notification of an external occurrence to be logged with the document. A new vertex is added to the tree database. The new vertex includes a script in which the new data item is defined as a data property. Metadata of the event handler vertex is updated to link the event handler vertex to the new vertex.

In some examples, the adding the new vertex can be performed at least partly by executing a script of the event handler vertex using an interpreter.

The innovations can be implemented as part of one or more methods, as part of one or more instruments or computing systems adapted to perform an innovative method, or as part of non-transitory computer-readable media storing computer-executable instructions for causing an instrument or computing system to perform the innovative methods. The foregoing and other objects, features, and advantages of the invention will become more apparent from the following detailed description, which proceeds with reference to the accompanying figures.

BRIEF DESCRIPTION OF THE DRAWINGS

FIG. 4 is a diagram illustrating a software program organized as a tree data structure.

FIGS. 13A-13B show script of an example synthesis function according to the disclosed technologies.

FIGS. 14A-14B show script of an example linking function according to the disclosed technologies.

DETAILED DESCRIPTION

Introduction and Overview

Figure 1:
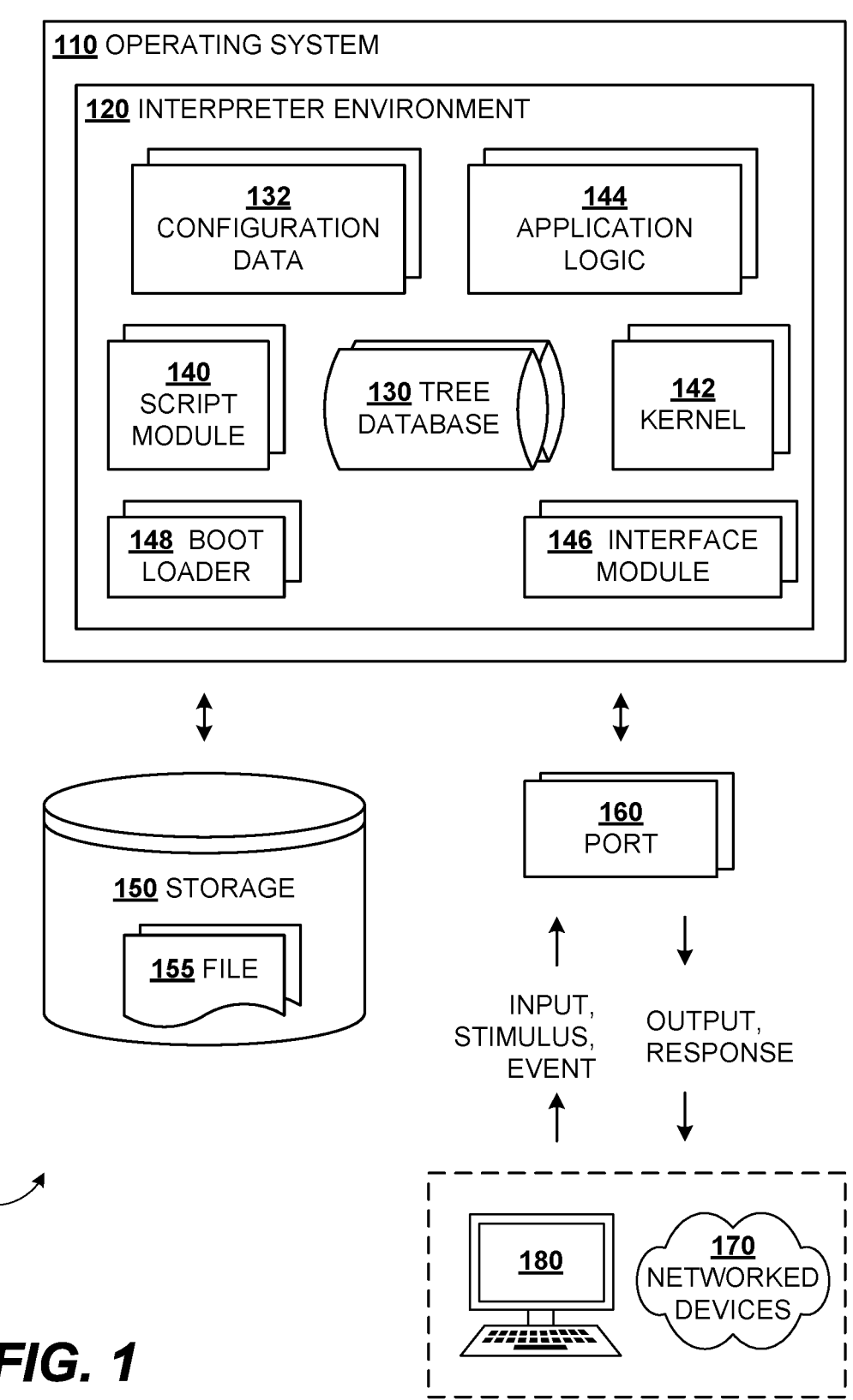
FIG. 1 is a diagram showing an example computing architecture in which the disclosed technologies can be implemented.

There is a need for transparent and self-explanatory database software that is accessible and verifiable by lay stakeholders. The trend in recent years has been opposite to this, with code size, complexity, and data volume steadily increasing. While some applications may benefit at scale from such large, complex, database systems, there are many other applications for which the disadvantages of complex software outweigh any purported benefits.

The technologies disclosed herein utilize script to provide transparency. Script can be run in an interpreter environment to build a hierarchical database incorporating one or more trees having nodes organized in parent-child relationships.

The nodes can contain data properties, which can include the user data stored in the database, and function properties, which pertain to operations that each node can perform. That is, the nodes can be active, and not merely passive receptacles for data. Co-location of functions and data enhances the self-explanatory nature of the database.

The disclosed technologies can operate according to an event-driven paradigm. Events can be of two or more classes. Events of a first class can cause the database to be modified, while events of a second class can cause queries to be performed on the database. Events can be routed to suitable nodes of the database for action. Events can also be logged within the database to maintain an intrinsic audit trail. A tree database according to the disclosed technologies can grow without bound, limited only by the available hardware resources.

The disclosed technologies can benefit a wide range of database applications, particularly those of small to medium size. Three applications, a communication appliance, a document manager, and an educational quiz are discussed in more detail herein. However, the features described can similarly benefit many other applications.

The disclosed technologies can be implemented as a method, as a non-transitory computer-readable storage medium, or as computing hardware. The disclosed technologies are suitable for implementation on a single-board computer as a teaching tool. The described features can be used in any combination or sub-combination.

Terminology

The usage and meaning of all quoted terms in this section apply throughout this disclosure unless clearly indicated otherwise or repugnant to the context. The terminology below extends to related word forms.

"Application logic" refers to software functions that can be specific to a particular application of the disclosed technology. For example, application logic for a communication appliance can include functions for logging or initiating a phone call, while application logic for a music distribution agreement can include functions for finding a definition of a term or logging usage of a song under the agreement. Because different nodes of a tree data structure can have different roles, application logic functions can also be specific to a particular class of nodes or even to a single node.

A "browser" is a program allowing display or navigation of linked files or objects. The linked files or objects can form a web, such as the World Wide Web, and the browser can be a web browser. A browser can support a range of formats used in the linked files or objects. For example, a browser can support Hypertext Markup Language (HTML) or JavaScript, and can incorporate a JavaScript interpreter.

The term "data structure" refers to a format for arranging, organizing, managing, or storing computer-readable data, which can include functions (sometimes dubbed "code"). Arrays, lists, records, tables, and trees are examples of data structures. The nodes or vertices of a tree data structure can include functions or data items in any combination.

The term "environment," without qualification, refers to a collection of functions, files, objects, or other software entities that are available during execution (i.e. at "run-time") of a software program. The environment can evolve over time as entities are added or removed, for example in response to events. In some examples, the environment can be regarded as being provided by an interpreter or operating system under which the software program is executed.

Qualified terms such as "operating environment" or "computing environment" can be different.

An "event" is a discrete stimulus to which software can respond. External events are received from outside the computing environment in which the software is operating, and can include inputs from a console coupled to the computing environment, for example commands typed by a user at the console. External events can include messages received over a network. Internal events are generated within the computing environment in which the software is operating, and can include clock events (e.g. scheduled by time or day, or as predetermined delays from other events) or monitor events (e.g. low battery or power loss condition, low available storage, network failure, or a data size having reached or exceeded a threshold).

"Event-driven" refers to a programming paradigm in which software primarily responds to events (internally or externally generated) and is largely idle when no events are being processed.

As a noun, the term "handle" refers to a name, pointer, address, or other reference by which a node, object, property, or other entity can be accessed.

An "interpreter" is a computer program that directly executes instructions of a target program from a script without requiring that the script be compiled into machine language prior to execution of the target program. An interpreter can be described as compiling one statement of the script at a time. The interpreter can execute that one statement before moving on to the next statement. In some embodiments, the script can be modified during execution of the target program and the target program can continue to execute, without interruption, using the modified script. JavaScript and Python are examples of script languages commonly executed by an interpreter. Some browsers incorporate a JavaScript interpreter. Stand-alone interpreters such as Node.js can run directly under an operating system, without a browser host, and can also be used. Some interpreters can support non-blocking (asynchronous) execution of tasks, or multiple tasks executing in parallel.

"Kernel" refers to one or more functions that are common across nodes of a tree data structure, with the caveat that certain functions requiring a child node of a given node could be inapplicable where the given node is a leaf node, and other functions requiring a parent node of a given node could be inapplicable where the given node is the root node. Common kernel functions can include addition of a new node to the tree data structure, forming links between parent and child nodes, forming links between a given node and another node, or navigating the tree data structure. Some kernel functions can be shared intact among multiple disparate applications.

A "link" is an entity in a software environment that enables a first object or node within the environment to be coupled to a distinct second object or node. Through the link, the first object, a function property of the first object, or a function operating on the first object, can read, write, call, transfer control to, or otherwise access the second object. For example, a link in a parent script module to a child script module can enable a function of the child script module to be called from the parent script module. The link can enable a data value of the child node, defined in the child script module, to be read or written from the parent script module. A link in the child script module to the parent script module can enable a function or a data value of the parent node to be accessed from the child node. A link can be unidirectional from node N1 to node N2 and does not imply existence of a link in the reverse direction, from node N2 to node N1. A bidirectional link between two objects exists where each object has a link to the other. The term link is also used occasionally in a second meaning, as part of a communication network, e.g. a communication link.

The term "logic" refers to any function or collection of functions, together with associated data, that performs one or more tasks of an application.

A "module" is an organizational unit of a script comprising one or more functions or blocks of script. Two or more functions or blocks of script within a single module can be arranged contiguously within a single text file or can be distributed among two or more files. In some examples, function properties of a node can be defined in a JavaScript text file, and data properties can be defined in a JSON text file, however this is not a requirement. In other examples, data properties can be incorporated with assignment statements in a JavaScript file, while in further examples, function properties can be embedded within a JSON file, and extracted to memory-resident interpreter script at run-time using a kernel function. In further examples, data properties and function properties of a node can be defined by respective blocks within a single file, using same or different script formats.

A "namespace address" is an identifier, handle, label, pointer, or sequence number of an object within a namespace of an environment. A namespace address can be a relative address, which may not be unique in the environment, or a unique address. A namespace address of a given object that is not unique can be incorporated as a field along with other fields to obtain a "unique namespace address" for the given object.

A "node" is a node of a tree, such as a tree data structure. The term "vertex" is used equivalently. A node can include a runtime object and can include a script representation of properties of the object, including data properties and function properties. Particularly, the script representation can include functions (code in the form of script) and data (variables defined in the script) side-by-side, within a same or different blocks of the script.

An "object" refers to an entity in a software environment which has one or more properties (data or functions) and which can be referred to by a handle or name. Although some disclosed embodiments use an object-oriented paradigm, this is not a requirement. An object can refer to any function or data item, including atomic datatypes or data structures. A node of a tree data structure can be an object.

The terms "data property" and "function property" follow the usage of properties for JavaScript objects, but are not limited to JavaScript. A data property is an attribute of an object that specifies a value of a data item. A data property can be a key-value pair. Data properties of nodes in a tree data structure can include values of application data (e.g. the data intended to be stored in a database) or metadata. Metadata can include a namespace address of an instant node, flags (e.g. do-not-delete), timestamps, and so forth. A function property of an object can specify a method that can be executed by or on the object. Function properties of nodes in a tree data structure can include application logic functions or functions related to tree infrastructure. Infrastructure functions can include adding or deleting child nodes, event routing, monitoring activity of the node or state of a subtree headed by the node, and so forth.

"Scope" refers to an extent within a software environment over which an object or its property can be accessible. That is, within the scope of a node, object, or property P, a reference to P can be correctly resolved, while outside the scope of P, a reference to P can result in an "undefined" value or other error condition. In some examples, the scope can be designated by an identifier of a node, function, module, or other software entity which defines the scope of an instant object or property.

"Script" refers to computer-readable text that can be processed by an interpreter running on a hardware processor to execute instructions or define variables or other data objects as specified by the script. "Text" is a sequence of characters in a human-readable character set (including an alphabet, numerals, or special characters; for example, a Latin alphabet, Arabic numerals, Kanji characters, mathematical symbols, or dingbat characters) stored in a digital representation on a computer-readable medium. Script excludes binary computer program code or source code of compiled languages. Script also excludes comments in text. In some examples, script can be in the JavaScript language or in a JavaScript Object Notation (JSON) format. Script functions can avail of varied resources present in, or provided by, an environment or an operating system. Particularly, a script function can invoke script or non-script (e.g. compiled) functions. As a discrete noun, a script can be a script module. A script of a given node can be in a single file, or distributed among multiple files.

"System functions" refer to functions provided by an interpreter or operating system under which disclosed software can be executed. System functions can include basic input/output functions such as to/from a console, memory, or storage, or over a network connection. System functions can also include clock functions or functions for filesystem management.

A "tree" is a data structure organized as a graph of nodes and edges. One of the nodes is a root node, and every other node of the tree has a unique parent node that can ultimately be traced back to the root node. Each edge of the graph joins a child node to its unique parent node. A tree can have a minimum of two nodes joined by one edge. The terms "parent node" and "child node" have meaning relative to each other, i.e. the parent node can itself be a child of another ("grandparent") node, and the child node can be a parent of a further ("grandchild") node. A node which is not parent of another node (i.e. it has no child nodes) can be dubbed a "leaf node". Two children of a common parent node can be dubbed "siblings." As a matter of convention, a tree can be considered as organized on a sequence of levels, with the root node at level 0 or level 1 at the top of the tree, and level numbers increasing going down the tree until leaf nodes are reached. A parent and its child can be on successive levels. A node of a tree can also be linked to nodes (of the same tree or a different tree) that are not its immediate parent or children. Inasmuch as these links do not define parent-child relationships, they are not edges of the tree graph, and do not imply that the associated data structure is not a tree. A "subtree" of a given node has the given node as root and includes all the nodes (children, grandchildren, etc.) beneath the given node, if any. A subtree having at least two nodes and one edge is also a tree.

Example Architecture

FIG. 1 is a diagram 100 showing an example computing architecture in which the disclosed technologies can be implemented. An interpreter can run under an operating system 110 on a computing system (not shown), to provide an environment 120. Entities within the environment 120 can read, write, load, or store files 155 on one or more storage systems 150. The entities within the environment 120 can also communicate via ports 160 of the computing system, receiving inputs from external devices 170, 180 or providing outputs to external devices 170, 180.

The interpreter environment 120 can host data and code in any combination. The data can be one or more tree databases 130, or other data structures. Data can also include auxiliary data such as configuration data 132. Code can include script modules 140, kernel modules 142, or application logic 144. Script modules 140 can define function and data properties of objects within the environment 120. Kernel 142 can include core functions of data structures 130 or associated script modules 140. Application logic 144 can include functions specific to a particular application of the disclosed technology (e.g. for a communication appliance, or for a smart document). Boot loaders 148 can initialize the tree data structures 130.

In some applications and environments, an interface module 146 can be provided e.g. as an interface to the console 180. Console interface module 146 can be implemented as a Read-Evaluate-Print Loop (REPL). Other applications can operate in a "headless" mode with no console input, and an interface module 146 for console 180 can be omitted. In further applications, console interface support can be provided as a native facility of the interpreter environment 120 or the operating system 110. Other external devices 170 can also have dedicated interface modules 146.

The various entities within environment 120 are shown separately for simplicity of illustration, however in an actual deployment these entities can be integrated together or further split apart in various ways. Particularly, script modules 140 can include both code and data, and can be integrated with the data structure 130 whose properties they define. Some or all of configuration data 132 can be integrated within a script module 140, a tree 130, or application logic 144. In some examples, some or all of kernel 142 can be provided as a script, while in other examples kernel 142 can be a binary executable. Similarly, some or all of application logic 144, console interface module 146, or boot loader 148 can be provided as a script, or can be provided as a binary executable.

The environment 120 can host additional code or data besides the entities shown in FIG. 1. Such additional code or data can be related to the embodiment of the disclosed technologies or can be unrelated. As a particular example, a single interpreter environment can host two or more disjoint deployments of the disclosed technologies, which can co-exist without interference. The entities within environment 120 can also access resources provided by the interpreter, by the operating system, or by a stand-alone application outside the interpreter (not shown).

In some examples, scripts can be copied from files 155 on storage 150 into computer memory for execution, however this is not a requirement. In other examples, the interpreter can execute scripts directly off storage 150, so that some or all of files 155 are part of the environment 120. File operations can be supported by the environment 120, for example with functions fs.writeFile( ) or fs.readFile( ) in the Node.js file system.

The computing system on which environment 120 is hosted can be a single physical computer, a virtual machine, a distributed computing system, or in a computing cloud.
External Devices The entities within environment 120 can receive inputs from, or provide outputs to, one or more external devices. Network connected devices 170 are shown in FIG. 1 as a cloud and can include communication or computing equipment, including equipment hosting other databases according to the disclosed technologies. A console 180 can also be an external device, which can be local to the instant computing system, or remotely connected via network. Inputs can be events, which can drive the operation of disclosed technologies within the environment 120. The disclosed technologies can be implemented following an event-driven paradigm. Other stimulus or inputs can also be received over ports 160. Audio inputs can be received from microphones or other audio signal sources. Outputs can be acknowledgments of inputs, responses to inputs, or triggers of events to be processed on remote computer systems. Outputs can also be generated in response to internal events within the environment 120.

Database Life Cycle

In some examples, script modules 140, tree database 130, or other components of environment 120 can be saved to storage 150, restored from storage 150, and can have persistence across power on-off cycles. In other examples, the tree database 130 can be transitory, and can cease to exist when the environment 120 terminates, or can be deleted when a reset event is processed in the environment 120. Initialization of tree databases 130 is described further herein, in context of FIG. 9.

First Example Method

Figures 2A, 2B:
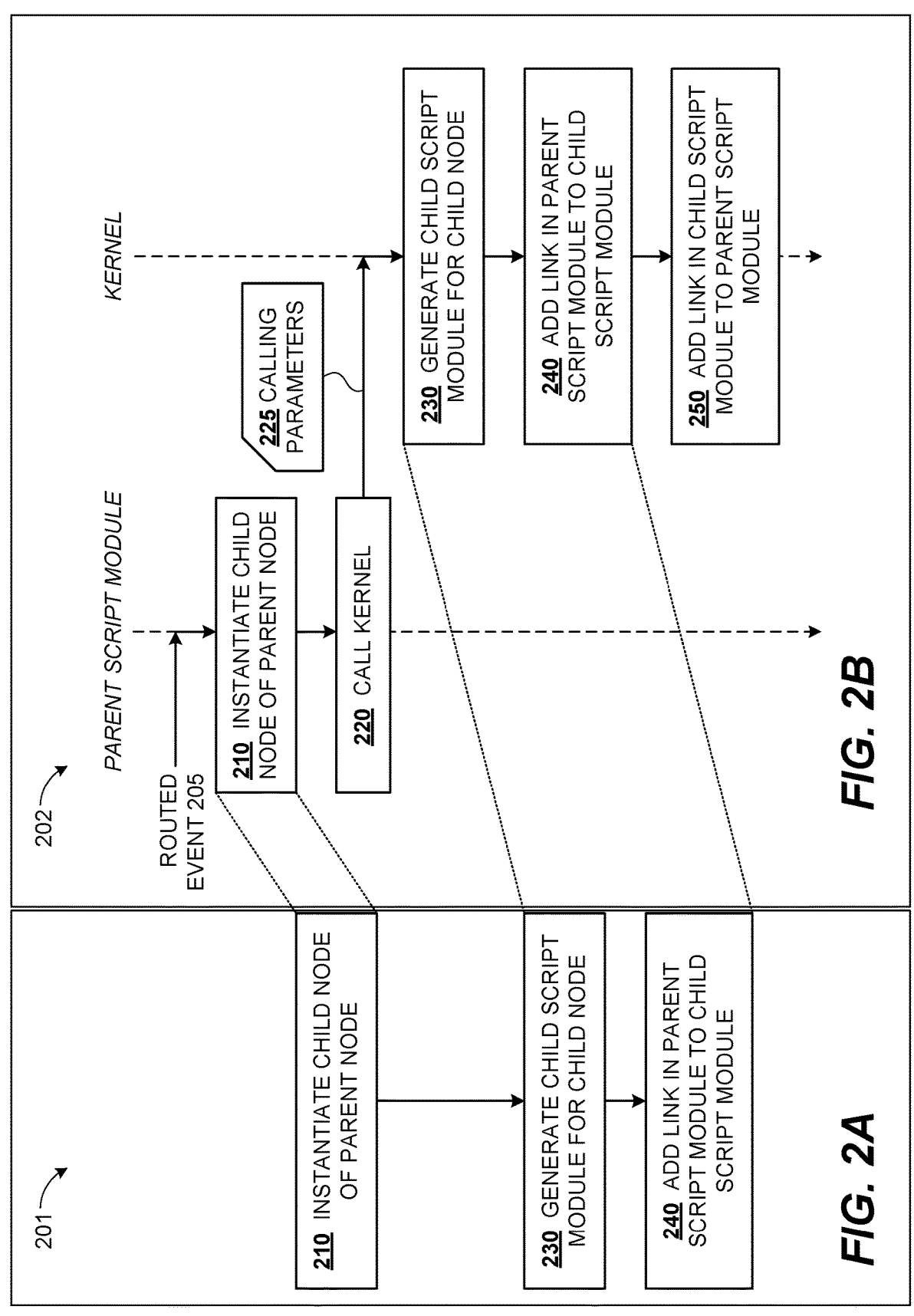
FIGS. 2A-2B are flowcharts illustrating variations of an example method according to the disclosed technologies.

FIGS. 2A-2B are flowcharts 201, 202 illustrating an example method according to the disclosed technologies, with variations. In this method, a child node can be added to a tree data structure and linked with its parent node. FIG. 2A shows a basic implementation of the method, while FIG. 2B shows a variation with additional details.

Beginning with FIG. 2A, a child node of a parent node can be instantiated at process block 210. Then, at process block 230, a child script module can be generated for the child node. Finally, at process block 240, a link to the child script module can be added in a parent script module associated with the parent node.

Turning to FIG. 2B, the abovementioned process blocks are organized in two lanes associated with the parent script module and a kernel respectively. The parent script module can define one or more functions of a parent node. Routing an event 205 to the parent node can cause the parent script mode to be invoked by an interpreter, which in turn can cause the event to be processed according to the instant method. Following execution of process block 210, one or more kernel functions can be called from the parent script module at process block 220, accompanied by calling parameters 225, described further below. Then, process blocks 230, 240 can be performed by the kernel. In some examples, the parent-to-child link of process block 240 can be supplemented by process block 250, where a link to the parent script module is incorporated within the child script module.

The methods of FIGS. 2A-2B can be implemented with numerous additional extensions or variations. The parent node and the child node can be nodes of a tree data structure. The parent script module can include script instructions (code) and also one or more data items of the parent node. Similarly, the child script module can include script instructions (code) and also one or more data items of the child node. The script instructions of the child script module can define one or more functions (or, function properties) of the child node. The parent or child script modules can also incorporate one or more calls to functions of application logic. The event 205 can be associated with a data item, and the child script module generated at block 240 can incorporate a computer-readable representation of the data item.

The parameters 225 can include handles of the parent node and child node. The kernel can also return a handle of the child node or the child script module to the parent node or the parent script module after process block 230 has been performed. The parameters 225 can also include an identifier of a scope containing the parent node. The identifier can be an identifier of a grandparent node, of which the parent node is a child.

The data structure of the parent and child nodes can be further grown in various ways, which can be described in terms of additional events. In some examples, the second event can be routed to the same parent node, and can be processed similarly to the first event, by instantiating a second child node of the parent node. In other events, the second event can be routed to a second parent node, and processed by a script module of the second parent node, which can lead to instantiating a child node of the second parent node. The second parent node can be within a same tree data structure as the parent node that processed the first event, or a different tree data structure. That is, an environment can support multiple tree data structures which can respond to different types of events. In further examples, the (first) child node generated at process block 230 can itself be an event handler, and the second event can be routed to the first child node. Then a second child node can be instantiated as a child of the first child node, and also can be linked with the first child node.

In some examples, the parent script module and the child script module can be within a common text file, while in other examples, the parent script module and the child script module can be within distinct respective text files. The distinct text files can be stored in a common directory, within a filesystem e.g. on storage 150. The organization of text files in directories can match the organization of respective nodes in a tree database, i.e. sibling nodes can be in a common directory, while script modules for two nodes that are not siblings can be in distinct directories.

The methods of FIGS. 2A-2B can be executed in an environment of the interpreter. In some examples, the interpreter can be a stand-alone interpreter (i.e. not integrated within a browser) running under an operating system such as 110. In other examples, the interpreter can be part of, or integrated within, a browser such as a web browser. Any of the script modules can conform to a JavaScript format, which can be any version of JavaScript itself, or JavaScript Object Notation (JSON), and can be interpreted accordingly.

First Example Tree Data Structures

Figure 3:
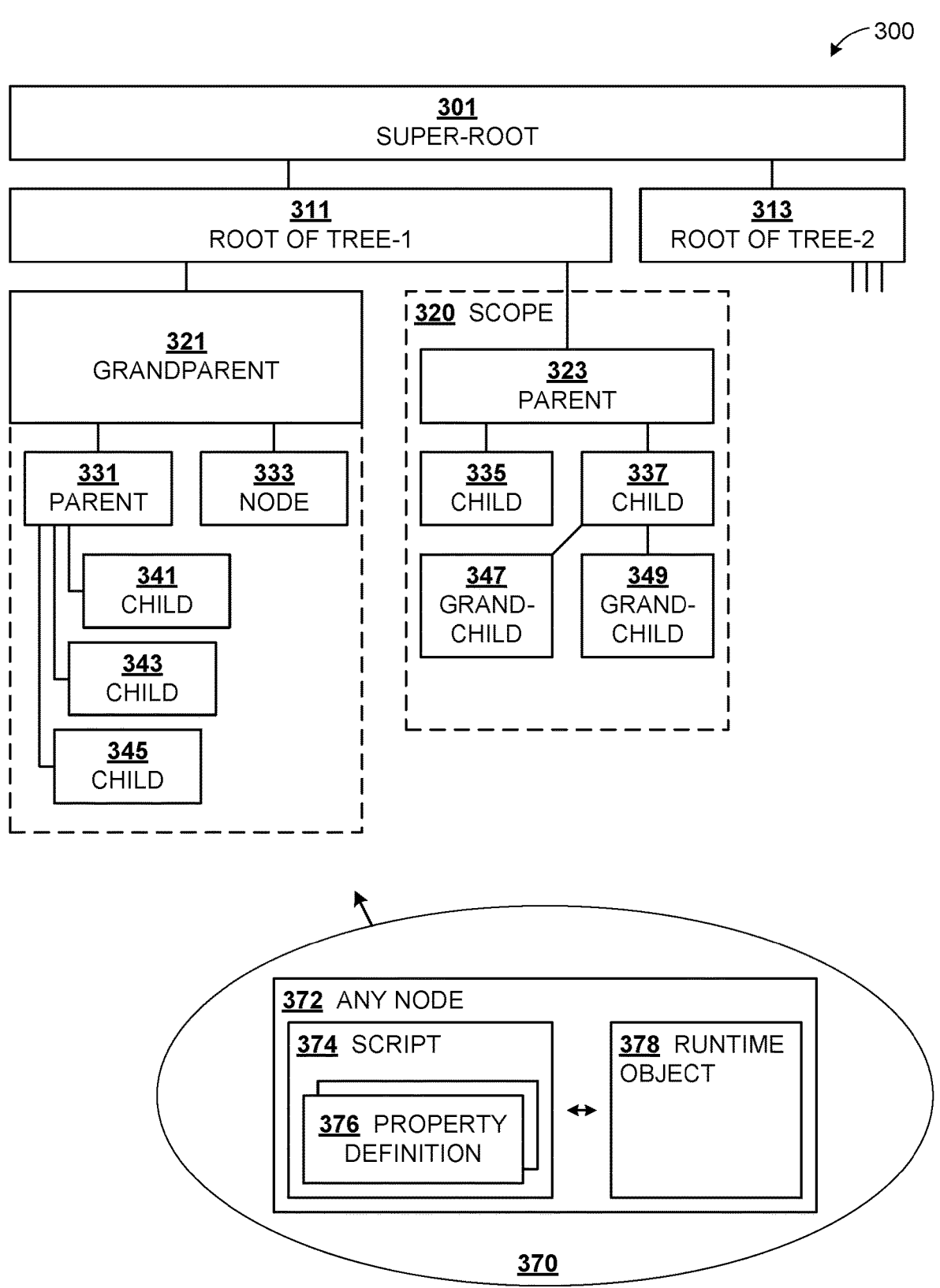
FIG. 3 is a diagram illustrating features of a tree database according to the disclosed technologies.

FIG. 3 is a diagram 300 illustrating example tree data structures according to the disclosed technologies. Data structures similar to those illustrated can be used to form one or more tree databases.

A deployment of the disclosed technologies can establish a root node 311 of a first tree. For purpose of discussion, root node 311 can be considered to be at level 1 of the tree "Tree-1". Below the root node 311, two nodes 321, 323 are shown at level 2. Node 323 is labeled as a parent, and can be an event handler. Through processing of events as described herein, child nodes 335, 337 of parent node 323 can be formed at level 3.

As illustrated, node 323 is within scope 320 which can be denoted by an identifier. Scope 320 can serve to disambiguate objects or properties within scope 320 from objects or properties outside scope 320. For example, an identifier of scope 320 can disambiguate node 323 from e.g. node 331, because node 331 is outside the scope 320. In some examples, child nodes 335, 337 can be distinguished from one another by identifiers (e.g. timestamps or other sequential identifiers) within the common scope 320. In other examples, child nodes 335, 337 can be distinguished from one another by having their own disjoint sub-scopes at level 3 (not shown), within the level 2 scope 320. Grandchild nodes 347, 349 (i.e. children of nodes 337) at level 4 are also shown.

Also at level 2 is grandparent node 321, which can be used to define scope for e.g. nodes 331, 333 beneath the grandparent node 321. In some examples, node 321 can be a dummy node, having only an identifier or links to its children as properties, and serving no function other than defining scope for its subtree, as indicated by dashed line. In other examples, node 321 can have additional or independent functionality, such as function properties, or data properties according to its defined role. Particularly node 321 can be an event handler, or can route events to other nodes such as children 331 or 333.

Within the scope of grandparent node 321 are nodes 331, 333 at level 3. Node 331 is labeled as a parent, and can be an event handler. Through processing of events as described herein, child nodes 341, 343, 345 can be formed at level 4. Node 333 is labeled simply "node" and can be an event handler (with no children as yet in the illustration of FIG. 3) or not.

The environment within which Tree-1 (having root node 311) is hosted can also host additional tree data structures concurrently, as indicated by root node 313 of Tree-2. For simplicity of illustration, additional details of Tree-2 are omitted from FIG. 3. In varying examples, Tree-1 and Tree-2 can support the same or different applications. For example, in a communication appliance, Tree-1 and Tree-2 can be for phone calls and email communications respectively, or can serve different phone numbers or different users. Alternatively, an environment can serve multiple disparate applications of the disclosed technology. For example, Tree-1 can serve a song database, while Tree-2 can serve a genealogy project.

Some environments define a unified global namespace. Tree-1 and Tree-2 can be attached to a super-root node 301 of the global namespace, at level 0 as shown. In other environments, Tree-1 and Tree-2 can be free-standing, and no top-level node 301 may be required.

Inset 370 illustrates example components of a generic node 372. Some or all of the illustrated components (with, optionally, additional components not shown), can be present for any of the nodes of trees Tree-1, Tree-2 illustrated in FIG. 3. A node can have a runtime object 378, instantiated within a runtime environment. A node can have script modules 374, which can include one or more property definitions 376 of the runtime object 378. In the script 374, definitions of both function properties and data properties of an instant node can co-exist. The bidirectional arrow between script 374 and runtime object 378 indicate that operations of the runtime object 378 can be performed by invoking portions of the script 374, and execution of the script 374 can operate on runtime object 378.

Thus, the tree architecture illustrated in FIG. 3 offers considerable flexibility in deployment of tree data structures and databases, which can be applied to diverse applications in a script-driven environment as described herein.

Second Example Tree Data Structures

FIG. 4 is a diagram 400 illustrating a software program organized as a tree data structure. A first tree 402 has a root node 401, and other nodes 411-413, 421-423, 431-433 arranged in hierarchical levels as shown. Solid lines join each child node to its parent node, for example, child node 422 is joined by solid line to its parent node 411. While some nodes such as 411 contain both code (e.g. definitions of function properties of node 411) and data (e.g. definitions of data properties of node 411), other nodes can contain just code (e.g. node 421) or just data (e.g. node 423).

Additionally, a node can be linked to other nodes besides its immediate parent node or its immediate children nodes. A link can be a data property of a first node whose value resolves to an identifier of a second node. Some possible links are shown in FIG. 4. As illustrated, node 433 contains a link which resolves to node 412. Nodes 423 and 432 contain links which resolve to node 433. A link is not prohibited from having a parent or child as a destination. For example, node 433 contains another link which resolves to its parent 422. Furthermore, a node can also be linked to a node outside its own tree. Thus, node 433 is shown having a link to node 425 in a separate tree 403. As illustrated, node 425 is descended from root node 405 via node 415.

In some examples, links can be dynamic over the lifetime of a tree data structure, and can be added, deleted, or retargeted to a different destination node.

Second Example Method

Figure 5:
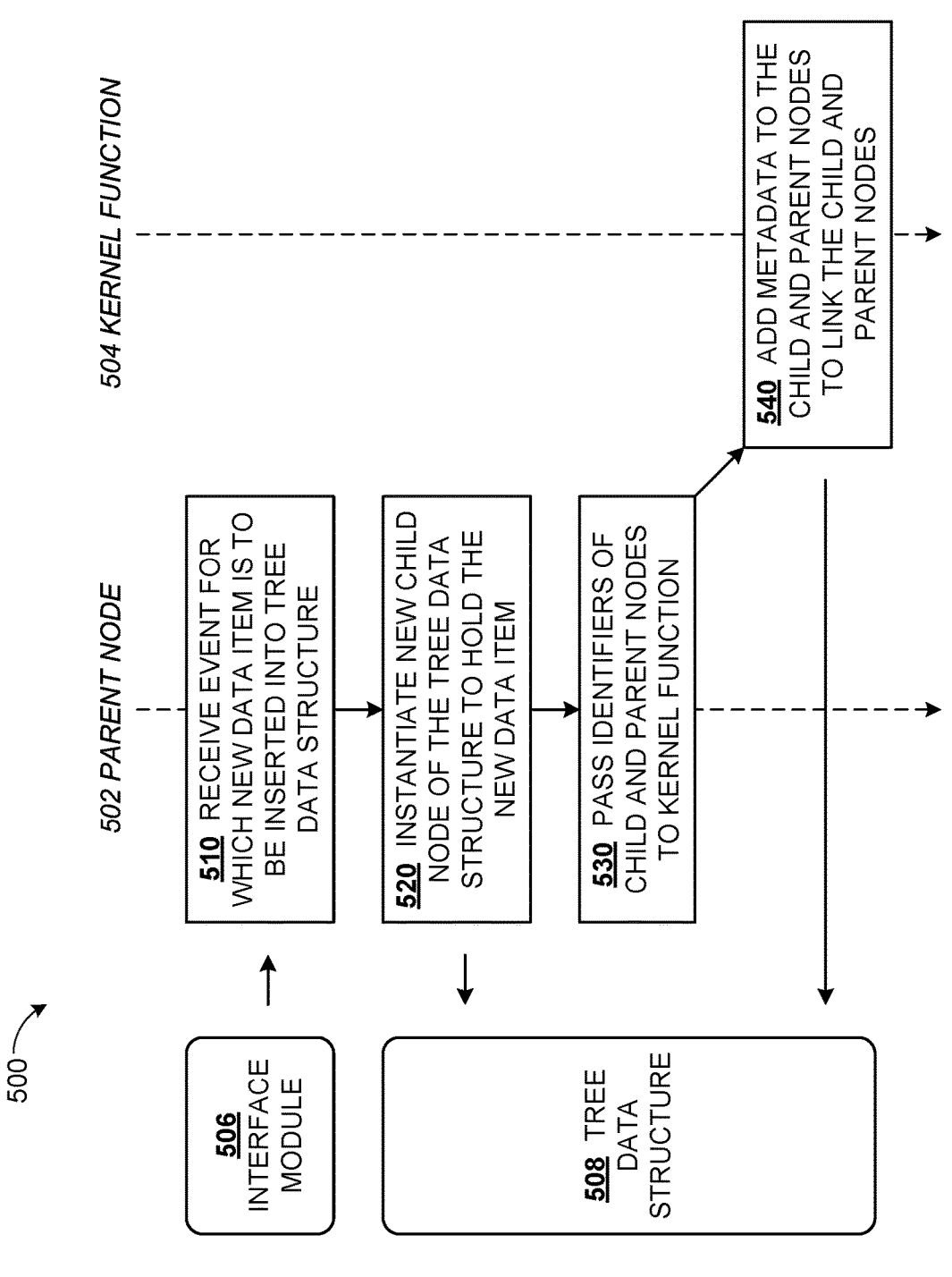
FIG. 5 is a flowchart illustrating a second example method according to the disclosed technologies.

FIG. 5 is a flowchart 500 illustrating a second example method according to the disclosed technologies. In this method, a parent node 502 handles an event assisted by a kernel function 504.

At process block 510, an event is received from an interface module 506. The event can indicate or require that a new data item is to be inserted into a tree data structure 508. At process block 520, a new child node of the tree data structure 508 is instantiated to hold the new data item. At process block 530, identifiers of the child and parent nodes can be passed to the kernel function 504. Then, at process block 540, metadata can be added to the child and parent nodes to link the child and parent nodes within the tree data structure 508. As indicated in FIG. 5, process blocks 510, 520, 530 can be performed by the parent node 502, while process block 540 can be performed by the kernel function 504.

Referring to block 510, in some examples the interface module 506 can be a listener module provided by the environment infrastructure, for example as part of a Node.js environment. In other examples, the interface module can be implemented as part of application logic, or can be an event routing function within a node of a tree data structure. For example, grandparent node 321 of FIG. 3 can implement a routing function to route events among, say, nodes 331, 333, 343. The event can be an event to be logged within the tree data structure 508. For example, the event can be an incoming SMS (short message service) message, or the event can be notification of a transaction which is subject to an instant tree-structured agreement. The parent script module can be selected from among a plurality of event handlers to handle the received event, based on a type of the received event.

Referring to block 520, the child node can be instantiated by a call to a constructor for the child node. The new data item can be an initialization value V passed to the constructor. In a pseudo-code example, pChild=new ChildNode (V) can instantiate a node of type ChildNode with initialization variable V, and return a pointer to the instantiated child node as pChild. In such an example, the pointer pChild can be used to add the child node to the tree data structure 508 immediately. In other examples, the constructor can be written within the kernel function call at block 530, so that the child node is instantiated (via call to its constructor) before the kernel function is called, but the pointer to the child node is not immediately available. Then, the kernel can add the child node to the tree data structure using handles of the child and parent nodes.

Referring to block 540, the added metadata can be in the form of a data property of the respective child or parent node that contains a handle to the other node. The data property can be added to the live runtime object of the child or parent node, or the data property can be added to child script module or parent script module respectively.

The method of FIG. 5 can be implemented with numerous additional extensions or variations. The parent node can include a parent script module and at least a first data item. The first data item can be within an assignment statement of the parent script module. The child node can include a child script module and at least the new data item. The child script module can include a computer-readable representation of the new data item. The new data item can be within an assignment statement of the child script module. The child script module can include a link to the new data item, and the new data item can be stored as a file separate from the child script module. For example, the new data item can be a voicemail message stored as an mp3 file, distinct from one or more text files storing the child script module.

In some examples, data properties and function properties of a node are both specified as script, while in other examples one or more properties can be specified in binary files. That is, data properties can be specified in binary files while function properties can be specified as script; or data properties can be specified as script while function properties can be specified as binary files; or data properties comprise script and binary items; or function properties comprise script and binary items.

In some examples, the tree data structure can be a database maintaining data of a communication appliance. The event can be a receipt of an incoming communication, or a request to originate an outgoing communication. The communication appliance can support other event types, such as events triggering search functions (e.g. "find the last call from Joe"), events triggering a billing function (e.g. "calculate the total number of international minutes used in outgoing calls"), or events triggering a listing function (e.g. "list all received text messages within the last three days"). Such additional events can cause application logic to traverse the tree data structure.

In further examples, the tree data structure can maintain data of a document. The event can be a notification of a transaction within purview of the document, such as a report of a number of views of an online image. Based on such notification, an event handler can log the event as a new child node, and can invoke application logic to initiate an electronic payment. The event can be an update to a definition of a term used in the document text. Based on such an event, a new child node can be added to a clause in which the defined term is used. The event can be an update to the set of items associated with or covered by the document. Based on such an event, a new child node can be added to a tree data structure indicating a new item added to the set of covered items. The document can support other event types, for example a query on the document, e.g. to find a particular definition, to list items (e.g. advertisements, music songs, digital images) related to the document, or to list a period of validity of the document. Such other events can cause application logic to traverse the tree data structure. In some examples, the traversal can include following a link from a first tree data structure (e.g. a tree of an instant document) to a second tree data structure (e.g. a tree of a reference document which is linked for its definitions, or a tree of a regulation or statute governing the instant document).

Third Example Method

Figure 6:
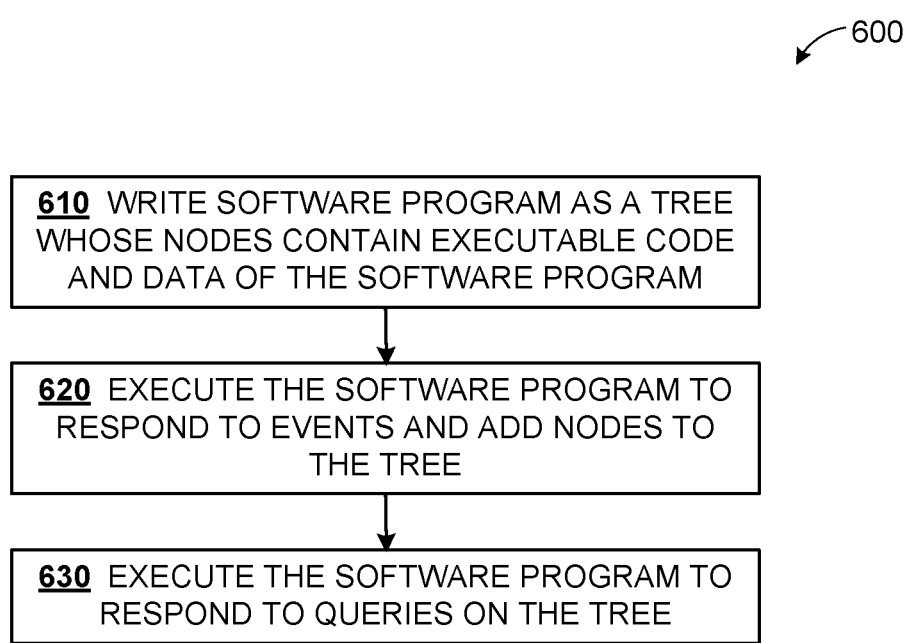
FIG. 6 is a flowchart illustrating a third example method according to the disclosed technologies.

FIG. 6 is a flowchart 600 illustrating a third example method according to the disclosed technologies. In this method, software program in the form of a tree can be executed to respond to queries and other events.

At process block 610, a software program can be written in the form of a tree, with at least one node containing both executable code (which can be in the form of script) and data of the software program. In some examples, all nodes of the tree can include both executable code and data.

At process block 620, the software program can be executed to respond to events, leading to nodes being added to the tree. The added nodes can also include script for executable code and data.

At process block 630, the software program can be executed to respond to queries on the tree. A query can be handled as an event generated by input from a console or other external device.

Example Communication Appliance

The deployment of disclosed technologies in a communication appliance is discussed with reference to FIGS. 7, 8, and 9. Although these figures are described in the context of a communication appliance, the same or similar techniques can be employed in other applications within the scope of the disclosed technologies. The illustrated communication appliance can support a variety of communication modes (e.g. email, phone calls, FAX (facsimile), SMS text message, instant message, or publish-subscribe messaging) with respective technologies, on one or more connected networks.

Architecture

The architecture of a communication appliance generally follows that shown in FIG. 1. The appliance can maintain an interpreter environment generally similar to environment 120. In this example, the external devices can include an edge device of a communication network, such as a Twilio server. One or more phone numbers, email addresses, or other network communication addresses can be registered at the edge device, so that the edge device maintains an addressable presence on the communication network.

Routing Incoming Communication

The communication appliance can support a range of event handlers, which can be organized according to one or more of several criteria. For example, the communication appliance can have different event handlers for email, phone calls, or other modes of communication. The appliance can have different handlers for different receiving addresses or phone numbers. Additionally, event routing can be dependent on a sender of a communication (e.g. blacklist, whitelist functionality), time of day or receiver status (e.g. do-not-disturb status), message classes (e.g. different routing for messages marked urgent, normal messages, or messages sent to groups), or other criteria.

Event routing can make use of different facilities within an environment. For example, in a Node.js environment, multiple event listeners can be registered to Node.js' EventEmitter. Event listeners can be cascaded. For example, a Node.js registered event listener can direct events to a second event router based on the destination address (e.g. called phone number). The second event router can be in application logic (similar to logic 144) or a script module (similar to module 140).

Figure 7:
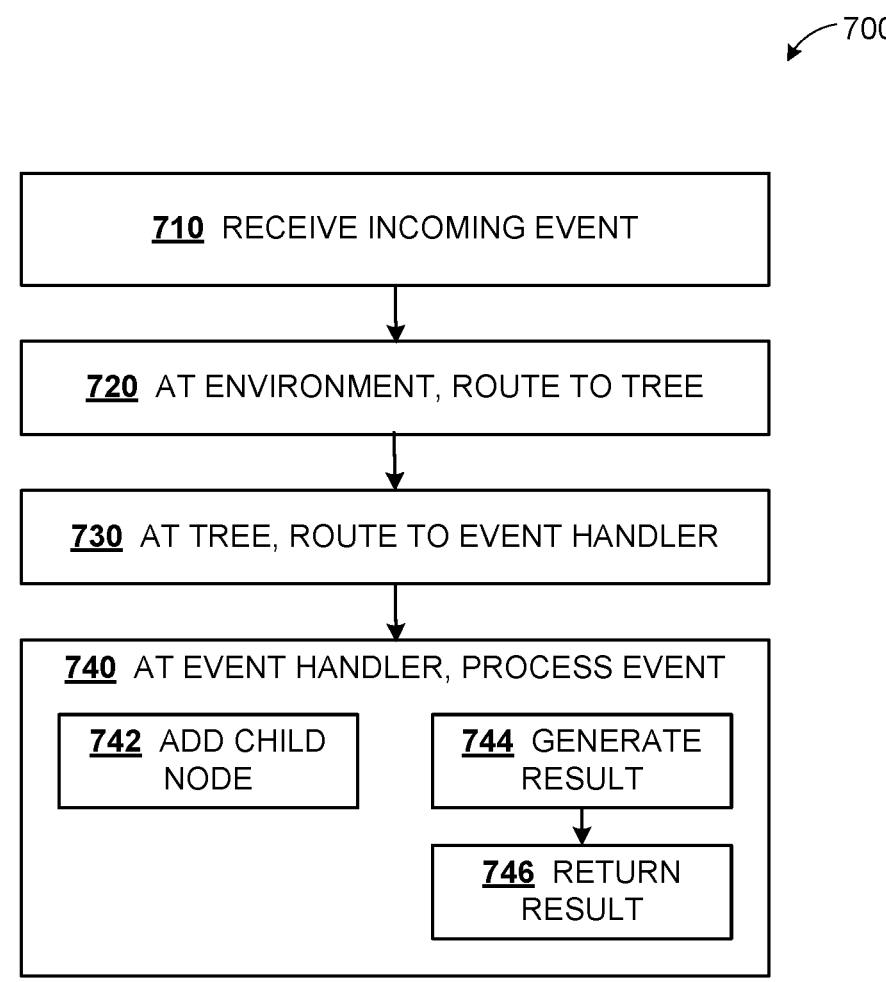
FIG. 7 is a flowchart illustrating an example method for routing and handling an incoming event according to the disclosed technologies.

FIG. 7 is a flowchart 700 illustrating an example method for routing and handling an incoming event. At process block 710, an incoming event is received. In a communication appliance, the incoming event can be an incoming communication, such as a phone call, or an SMS text message. The incoming event can also be a request to initiate an outgoing phone call or other outgoing communication. The incoming event can also be a query on an associated tree database.

At process block 720, the incoming event can be routed using facilities of the environment, for example, with event listeners registered to an EventEmitter in a Nodejs environment. In a communication appliance, routing at this process block can be based on a phone number or other communication address associated with a recipient of the incoming event. Routing at process block 720 can forward the incoming event to a handler or router at a tree associated with the recipient address.

At process block 730, having reached an appropriate tree, the incoming event can be further routed to a specific event handler. In a communication appliance, routing at this process block can be based on a communication mode (e.g. email, FAX, etc.) or on an event type (e.g. query, incoming communication, request for outgoing communication).

Then, with routing completed, the event can be processed at process block 740. For some events, and as described herein, event processing can include adding or linking a child node into an instant database, as indicated at block 742. Alternatively or additionally, a processed event can also lead to a result being generated, as indicated at block 744. For example, the result of a query can be a suitable response, which can be an identifier of a prior event or a listing of one or more events, or a property of one or more events. The result of an incoming communication can be one or more key-value pairs returned to the edge device allowing completion of the communication event, for example by completing a call, or by acknowledging receipt of the communication. At process block 746, the generated result can be returned to an external device, such as a console or an edge device.

Event Processing

Figure 8:
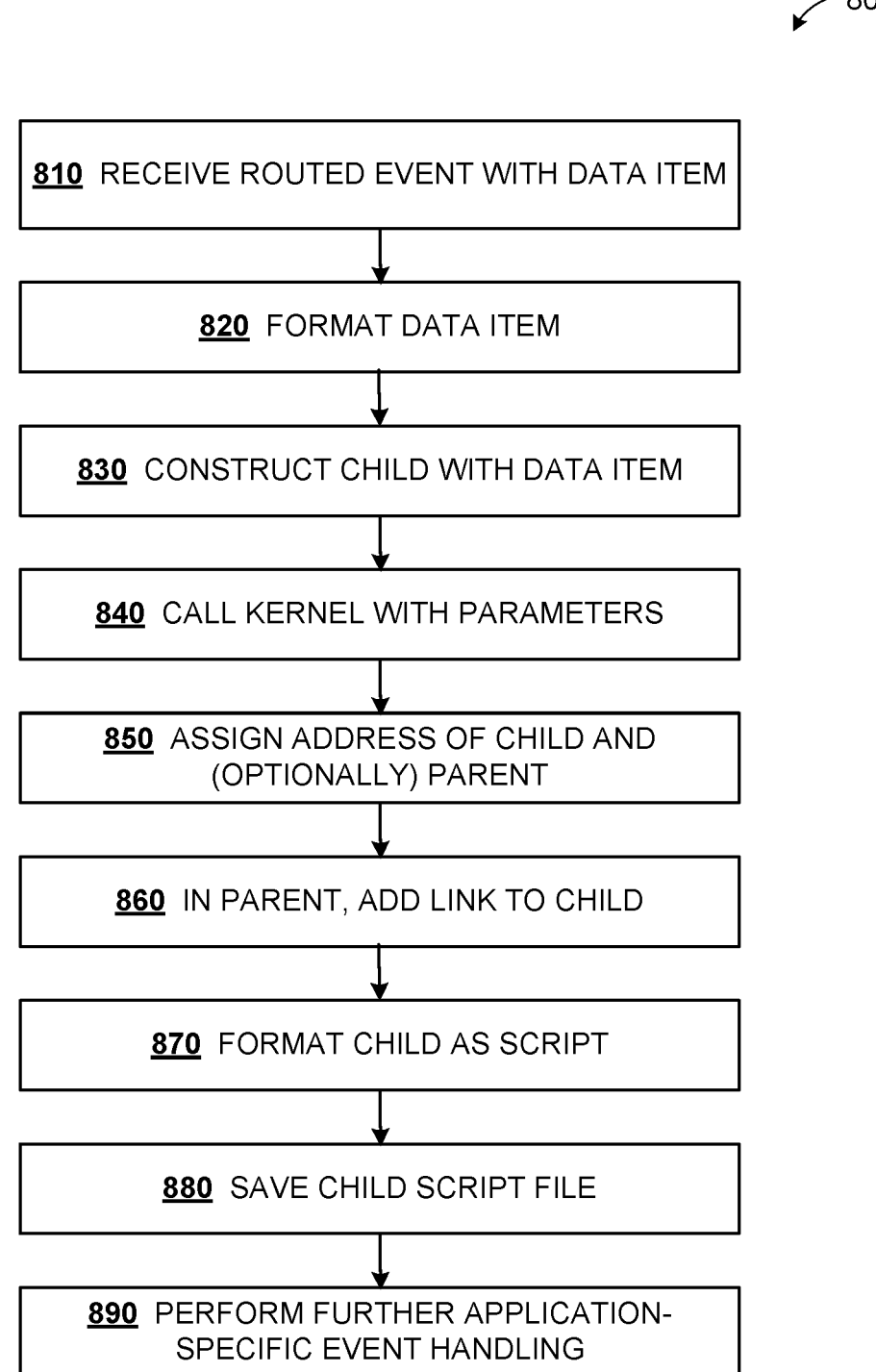
FIG. 8 is a flowchart illustrating an example method for handling an event according to the disclosed technologies.

FIG. 8 is a flowchart 800 illustrating an example method for handling an event. The illustrated method pertains to an event for which a child node is added to a tree data structure, and can be performed by the parent node, in particular by execution of a parent script module associated with the parent node. The parent node can invoke kernel functions to assist with one or more of the illustrated operations. Although FIG. 8 is described in context of a communication appliance, the illustrated method is generally applicable to other deployments of the disclosed technologies.

At process block 810, a routed event is received, accompanied by a data item. For example, the event can be an incoming phone call, and the data item can be a timestamp or a caller ID. At process block 820, the data item can be formatted, as the format required by subsequent operations may be different from a format in which the data item is received. For example, the data item can be formatted as JSON. At process block 830, the parent node can call a constructor to construct a child node. The formatted data item can be passed as an initialization data value to the constructor. The parent node can cause the child node to be incorporated into the tree data structure. The requisite functions can be implemented within a kernel module, which can be called at process block 840. One or more of blocks 820, 830, 840 can be performed by executing function properties of the parent node.

At process block 850, a namespace address of the child node can be assigned. The child namespace address can be of the form ⟨Parent Address⟩.⟨Sequence Identifier⟩, where the ⟨Sequence Identifier⟩ can include a character string (e.g. "#") designating that the field is a sequence identifier, and an ordinal number, such as 1, 2, 3, . . . for the successive child nodes added beneath an instant parent, so that #1 could indicate the oldest child node. (The symbols "⟨" and "⟩" are for clarity of notation in this disclosure, delimiting respective fields of a namespace address; these symbols may be absent in actual usage of the disclosed technologies.) The ⟨Parent Address⟩ can include a ⟨Scope⟩ field to disambiguate different instances of similar parent nodes. Thus, a parent address can be of the form ⟨Scope⟩.⟨Parent Identifier⟩. In varying examples, the ⟨Scope⟩ can be an identifier of an explicit named scope, or a namespace address e.g. ⟨Grandparent Address⟩ which implicitly defines a scope, as discussed in context of FIG. 3. The parent identifier can be a name unique within the scope, a ⟨Sequence Identifier⟩ relative to a parent of the parent node, or a fully qualified namespace address as described further herein.

In some examples, the parent address can be assigned at initialization, or when the parent node is registered as an event handler by application logic. In other examples, the parent address can be assigned within process block 850, prior to assigning a namespace address of the first child of the parent node. With address assigned, at process block 860 a link to the child can be added to the parent, either within the parent runtime object or by insertion of a computer-readable definition into the parent script module.

Because the functions of blocks 850, 860 are common to many nodes of a tree data structure, and can be common across disparate applications of the disclosed technologies, blocks 850, 860 can be included within a kernel module. After completion of kernel functions, the method of FIG. 8 can transfer control back to the parent script for subsequent operations. Process block 840 includes passing parameters to the kernel module. These parameters can include handles of the parent node and the constructed child node. In cases where the parent namespace address is also assigned at block 850, the parameters can include a disambiguating scope identifier.

At process block 870, the properties of the child node can be formatted as one or more script modules, which can be saved as a script file at process block 880. In varying examples, one or both of blocks 870, 880 can be incorporated with the kernel module, within the parent script module, or within application logic called from the parent script. At process block 890, additional application-specific event processing can be performed, which can invoke functions from application logic such as 144.

The above example is provided for illustration. Numerous variations can include fewer or more than the illustrated process blocks, and can vary the order in which illustrated operations are performed.

Tree Databases

Figure 9:
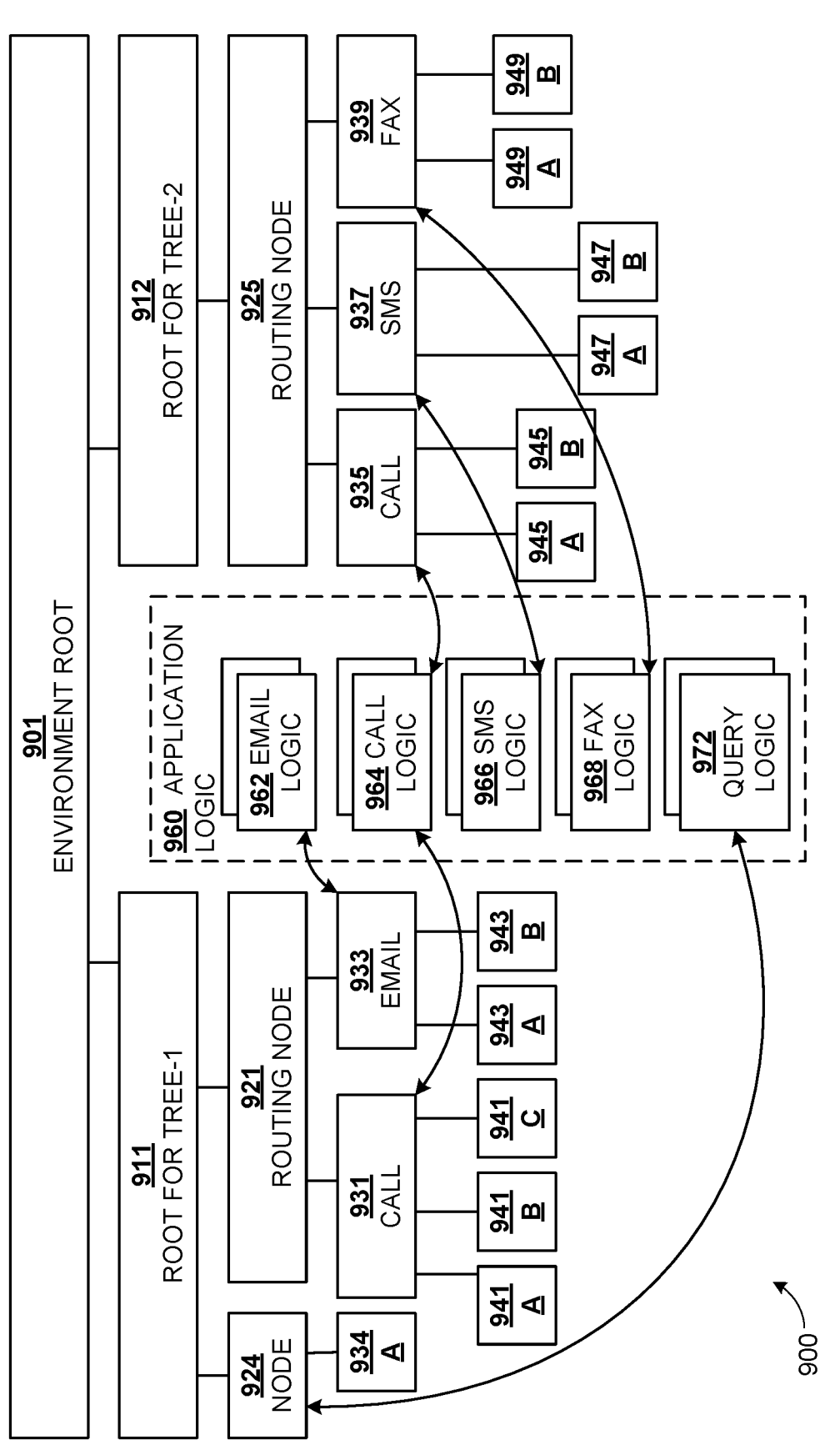
FIG. 9 is a diagram illustrating the functionality of two tree databases in a communication appliance implementing the disclosed technologies.

FIG. 9 is a diagram 900 illustrating two tree databases in a communication appliance implementing the disclosed technologies. Each node of the tree databases can be implemented as a script module defining data and function properties of the associated node.

As illustrated, node 911 is a root node for a first tree named Tree-1. Tree-1 can manage communication associated with a particular user (e.g. "User1") across various modes of communication. Node 921 is a routing node. All communication events for the user, across multiple addresses or phone numbers of User1, can be routed from the environment to routing node 921. In turn, node 921 can route incoming phone calls and emails to event handling nodes 931, 933 respectively. The event routing is similar to that described in context of block 730 in FIG. 7.

Turning to event handling, node 931 can act as a parent node, and can instantiate and add child nodes 941A-C to Tree-1 for successive incoming calls. Similarly, parent node 933 can instantiate and add child nodes 943A-B to Tree-1 for successive incoming emails. The event handling can be similar to that described in context of FIG. 8. Besides adding child nodes to a tree, a parent node can perform additional event processing that is specific to an application (e.g. a communication appliance) and to an event type (e.g. email or phone call). Thus, parent nodes 931, 933 can invoke call logic 964 or email logic 962 to handle calls or email respectively, as shown by curved arrows in FIG. 9. The specific logic 962, 964, 966 can be located within application logic 960.

Node 912 is illustrated as a root node for a second tree named Tree-2. Tree-2 can manage communication associated with a particular recipient address such as a phone number. All incoming communication events for this phone number can be routed by the environment to routing node 925, and thence to event handlers 935, 937, 939 for voice calls, SMS, or FAX communication modes respectively. Similar to the architecture for Tree-1, nodes 935, 937, 939 can cause child nodes 945A-B, 947A-B, 949A-B to be added to Tree-2 for successive events of each communication mode, and can invoke call logic 964, SMS logic 966, or FAX logic 968 for further handling specific to each communication mode.

As described herein, some environments may have a global namespace with a shared root 901, to which both Tree-1 and Tree-2 can be attached. However, this can depend on the environment, and an environment root node 901 can be absent in other examples of the disclosed technologies.

Query Processing

A tree database can also support additional functionality. Within Tree-1, node 924 can implement an event handler for queries on Tree-1. That is, query events on Tree-1 can be routed to node 924. Node 924 can invoke functions of query logic 972 to process queries. In some examples, a query can result in creation of a child node 934A, for example to log a query, its result, or a timestamp. In variations, node 924 can be a child of routing node 921, and query events for Tree-1 can be routed via routing node 921 to the query handler 924. Tree-2 can also support queries similarly (not shown).

Queries can be implemented with a Read-Evaluate-Print-Loop (REPL) to handle console input within an interpreter environment. In some examples, the REPL can be implemented within application logic and can be called from a query event handler. To illustrate, a query can be entered from a console as "User1.Find (Call, 'John')" to search for calls received from John. This query event can be routed to node 934 because Tree-1 manages communications of User 1. Node 934 can invoke a Find( ) function from query logic 972 to operate on the call subtree headed by node 931, to search among call events 941A-C for calls from John. In varying examples, the search results can be logged to a child node 934A or transmitted back to the console.

Initialization

In some examples, an empty tree data structure can be initialized. With reference to FIG. 1, initialization can be performed with a boot loader 148 and configuration data 132, within an environment such as 120. The boot loader can be binary or script, and be situated within application logic

144 or script modules 140. Configuration data 132 can be loaded from a separate text file, or can be incorporated with script modules 140, or within a script boot loader 148. The boot loader 148 can be invoked by a command from console 180.

Invocation of boot loader 148 can cause at least root node 911 of a new tree to be constructed, to which other tree nodes can be attached. The boot loader can also cause tree nodes that are registered as event routers or event handlers to be constructed and added to the new tree. Within Tree-1, these can include nodes 921, 924, 931, or 933. Boot loader 148 can also instantiate nodes that define scope for other nodes, such as grandparent node 321 of FIG. 3. Operations of boot loader 148 can be guided by the configuration data 132.

The boot loader 148 can be invoked more than once in a session of environment 120. For example, a first invocation of boot loader 148 can initialize Tree-1 for User1, while a second invocation of boot loader 148 can initialize Tree-2. An environment 120 can support multiple boot loaders 148, for different applications or different instantiations of a single application. For example, multiple instances of a communication appliance within a single environment can share a single boot loader (executed with distinct configuration data) or can have distinct boot loaders.

Example Document

The deployment of disclosed technologies for managing a document is discussed with reference to FIGS. 10-11. Although these figures are described in the context of a music database, the same or similar techniques can be employed in electronic health records, licensing contracts, securities agreements, product catalogs, or other applications.

Figure 10:
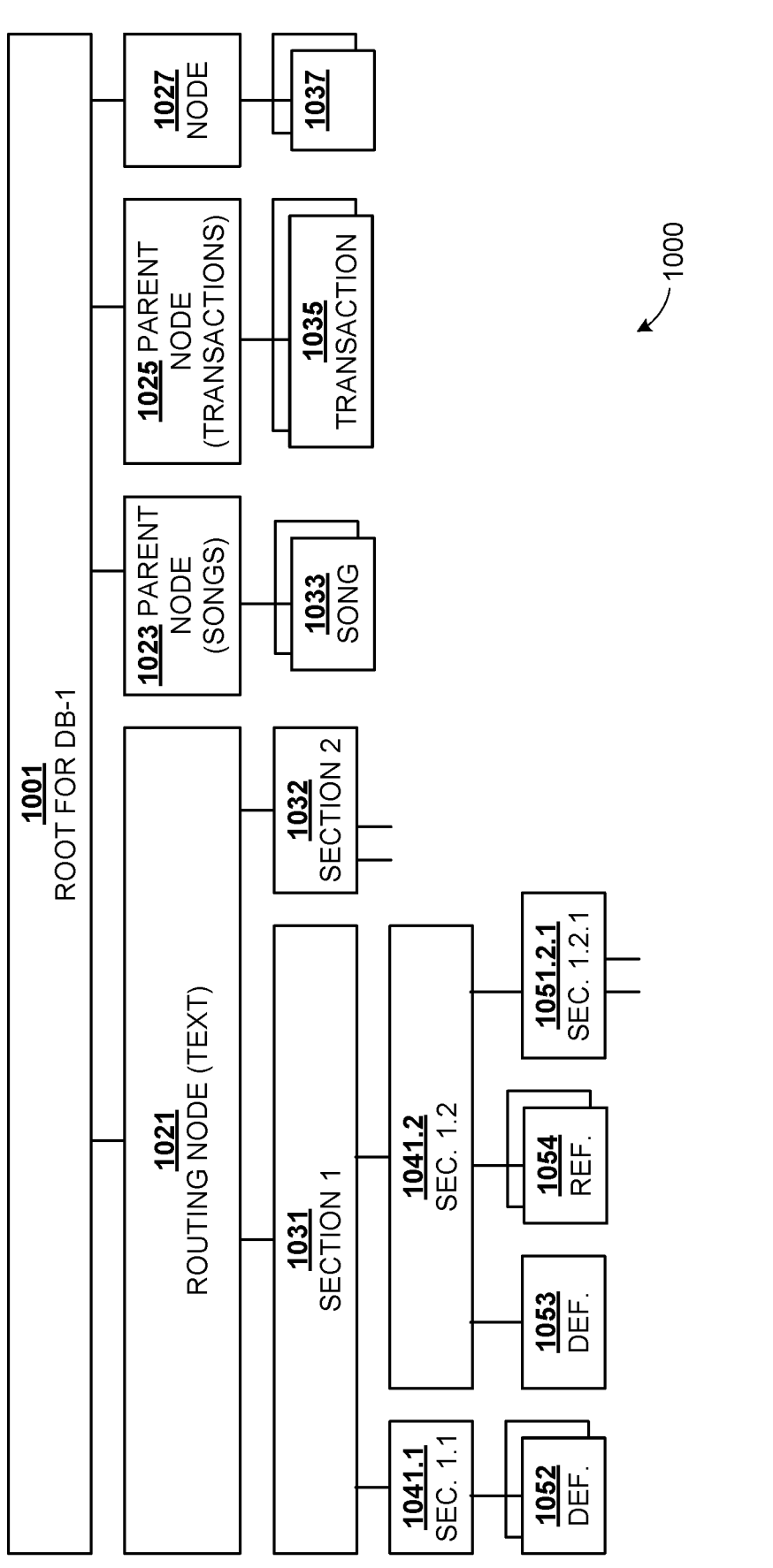
FIG. 10 is a diagram illustrating a tree database for managing a music database using the disclosed technologies.
Figure 11:
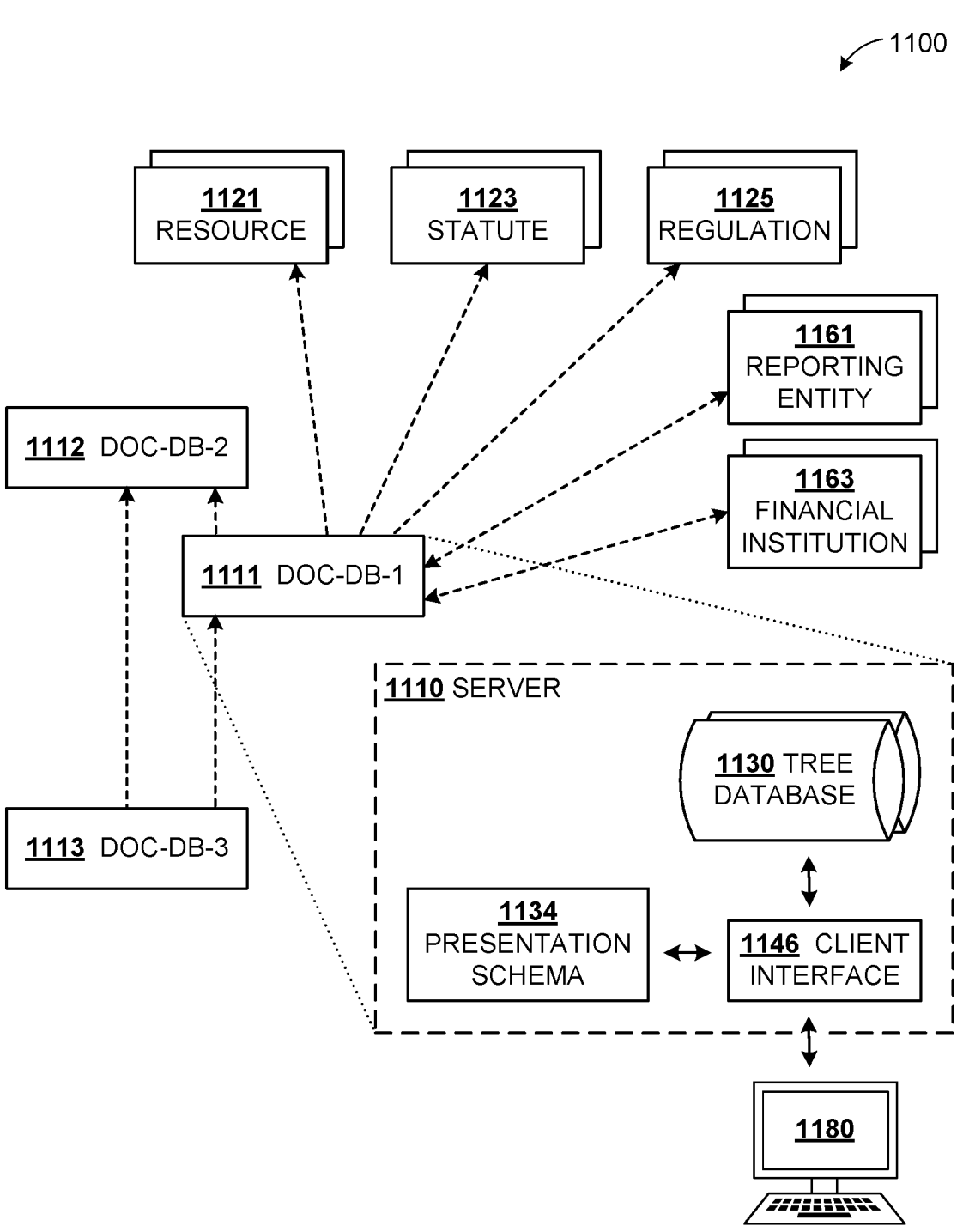
FIG. 11 is a diagram of relationships between a document and other entities, as can be implemented with the disclosed technologies.

FIG. 10 is a diagram 1000 illustrating a tree database for managing a music database (DB-1) using the disclosed technologies. The music database can include a text document, organized hierarchically with sections, sub-sections, and so forth under routing node 1021. The music database can also include a set of songs 1033 organized under a parent node 1023, and a set of transactions 1035 associated with those songs, organized under parent node 1025. In some examples, various parts of the database DB-1 can be organized under a common root node 1001.

The text document can serve various functions, containing descriptive material about the database, contact information for maintainers or purveyors of the database, or terms for accessing the database. In some examples, the text document can include a licensing contract between a distributor and parties seeking to play songs of the database. FIG. 10 shows two sections 1031, 1032 of such a text document organized as nodes under a routing node 1021 for the text portion of the database DB-1. Section 1031 has children nodes for sub-sections 1041.1 (section 1.1) and 1041.2 (section 1.2). In turn, the latter has a further subsection 1051.2.1 (section 1.2.1). The data properties of any of these nodes can be the text associated with the respective section. Additional data properties can include a field for the hierarchical section number, or a timestamp indicating the last time the node was edited, either for editing the text or adding a child node. Within any section there can be terms having specified definitions, which can be maintained as child nodes of the instant section. In FIG. 10, section 1041.1 has multiple definitions 1052 (marked "DEF.") and section 1041.2 has a single definition 1053. A section can also be linked to one or more external references, which can be e.g. other documents, contracts, statutes, regulations, or other resources. In FIG. 10, section 1041.2 has multiple references specified by respective nodes 1054 (marked "REF.") The hierarchical structure of FIG. 10 is illustrative. Other more complex documents can readily be organized following the principles illustrated in FIG. 10.

DB-1 can have additional tree structures, a few of which are illustrated. The application can have a tree maintaining a database of songs which are part of or covered by DB-1. Child nodes 1033 for each song can be organized under a parent node 1023 using the disclosed technologies. For simplicity of illustration, the song nodes 1033 are shown on a single level. However, a multi-level organization can also be used, organized e.g. by year of performance, artist, or other keys. The data properties of a song node can include a record of song metadata in an industry-standard format. The function properties of a song node can support queries on the song, or can support adding child nodes e.g. for different versions of an instant song.

DB-1 can also have a tree maintaining a database of transactions which are covered by DB-1. Child nodes 1035 for each transaction can be organized under a parent node 1025 using the disclosed technologies. For simplicity of illustration, the transaction nodes 1035 are shown on a single level. However, a multi-level organization can also be used, organized e.g. by type of transaction (performance of a song, disbursement of royalties for performances), song, or originator or recipient of a payment. In some examples, transaction nodes can be logged as child nodes or subtrees of song nodes.

Any of the nodes illustrated can incorporate both function properties and data properties within a script module. The function properties of a text node can include functions for adding a child node, as described herein, or for supporting queries. Text nodes can support functions for extracting data from associated text or descendant nodes of an instant text node. Extracted data can be compiled, formatted into a report, or reorganized from a tree structure into a tabular data structure. Text nodes can also support functions for displaying text on a browser, for example by collapsing or expanding nodes of a tree data structure. Any of these function properties can call functions of a kernel module or functions resident in application logic.

Write-Only and Modifiable Databases

The disclosed technologies can support both write-only databases and databases with dynamic modifiable data entries. The former can be applicable for logging events, such as record-keeping in a communication appliance. The latter can be applicable for documents, which can be subject to modification. A single embodiment of the disclosed technology can include both types of tree databases. For example, in a music database application, the transaction log can be a write-only subtree headed by root node 1025, while the text can be a modifiable subtree headed by root node 1021. As a variant, a write-only tree can have immutable entries, however entries can be added or removed from the tree over time. The song tree headed by root node 1023 can be such a tree.

In some examples, changes to a document or file directory can be logged by an event handler node using an external version control system (e.g. Git).

Relationships Between a Document and Other Entities

A document database may not exist in isolation. In some examples, an instant document can be associated with other documents or entities in an environment. FIG. 11 is a diagram 1100 of relationships between a document (Doc-DB-1 1111) and other entities. For example, portions of Doc-DB-1 1111 can be dependent on another document, Doc-DB-2 1112, as shown by dashed arrow. That is, Doc-DB-1 1111 can include a node similar to node 1054 containing a link to, or handle of, Doc-DB-2 1112. When an action on Doc-DB-1 1111 causes the link to Doc-DB-2 1112 to be followed, an event can be generated at Doc-DB-2 1112 and handled by an event handler node of Doc-DB-2 1112. In similar fashion, a third document Doc-DB-3 1113 can have reference nodes linking to Doc-DB-1 1111 and Doc-DB-2 1112 respectively. The event handler nodes at documents 1111, 1112 for incoming references can be the same nodes that handle local queries on documents 1111, 1112, similar to node 924 of FIG. 9.

Doc-DB-1 1111 can also be governed by or linked to statutes 1123, regulations 1125, or other resources 1121. In some examples, these references 1121, 1123, 1125 can also be formatted as tree data structures according to the disclosed technologies, and can include event handlers similar to node 924 of FIG. 9.

Doc-DB-1 1111 can also be linked to a reporting entity 1161 which can provide notifications related to the subject matter of Doc-DB-1 1111. This link can be bidirectional, as Doc-DB-1 1111 can also provide updates to the reporting entity 1161, e.g. for additional songs for which reporting is requested. Doc-DB-1 1111 can also be linked to a bank or other financial institution 1163, to initiate transactions at the institution 1163 or to receive notifications of transfers from the institution 1163. As illustrated, in some examples, Doc-DB-1 1111 can be coupled to multiple reporting entities 1161 or multiple institutions 1163.

Each of documents 1111-1113 can be implemented in an environment similar to 120 on a server 1110 as shown in an inset. The document can include one or more tree databases 1130, which can be similar to the tree database of FIG. 10. The server 1110 can provide a client interface 1146 and a presentation schema 1134 to define e.g. display formatting for viewing, querying, or modifying the database 1130 from a client 1180. The presentation schema 1134 can variously be implemented using JavaScript, HTML, cascading style sheets (CSS), or similar technologies.

Events Associated with a Document

The tree database of FIG. 10 can support a variety of event types that can lead to adding child nodes as described herein. A console input can trigger an event to add a definition of a term to a document paragraph. Another console input can trigger an event to link a term to an external reference. Further console inputs can cause text of a document to be modified. Document revisions can be tracked locally within the tree database, or externally with a version control system. Still further, console inputs can lock a text tree that has been agreed on by the relevant parties, or unlock a document text tree when the parties agree to amend the text. A message input can trigger an event to add a child node for a new song under parent node 1023. Another message input can report a transaction subject to Doc-1, which can be logged as a new child object under parent node 1025. Still further, the database for Doc-1 can include a node 1027 to handle query events, operating similarly to node 924 of FIG. 9, and queries can be logged to child nodes 1037.

Additionally, an incoming event can trigger an outgoing event. A message input reporting a transaction, can be processed by an event handler node according to the terms of the document, and can automatically trigger a payment event at a linked institution 1163. For example, upon notification from a reporting entity 1161 that a particular song has been played 345 times, amounts can automatically be debited from a music station's credit account; royalty payments can automatically be initiated to rights holders such as a music publisher, performer, or song writer; or the difference can be applied to an account of a music distributor.

Fourth Example Method

Figure 12:
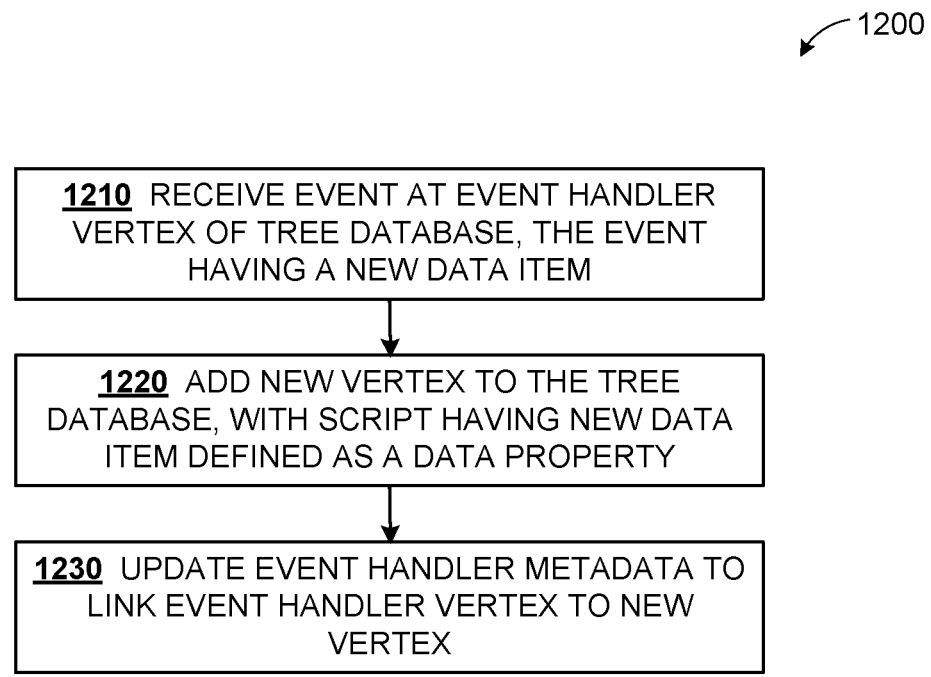
FIG. 12 is a flowchart illustrating a fourth example method according to the disclosed technologies.

The techniques described regarding documents can be generally applied to a wide range of document types that are associated with external entities or databases. FIG. 12 is a flowchart 1200 illustrating such techniques as a fourth example method. In this method, updates are made to a tree data structure of a document having a set of related entities. In the context of music licensing, the related entities can be songs of a music licensing agreement, logs of song performance, or logs of associated payments. In this method, an event is received at an event handler which is a vertex of a tree data structure, a new vertex is added to a tree database, and the event handler vertex is linked to the new vertex.

At process block 1210, an event can be received at an event handler vertex within a tree database. The event can be accompanied by a new data item, which can be a definition of a term in the document, an identification of a new entity to be added to the set of related entities, or a notification of an external occurrence to be logged with the document. At process block 1220, a new vertex can be added to the tree database. The new vertex can include a script in which the new data item is defined as a data property. At process block 1230, metadata of the event handler vertex can be updated so that the event handler vertex is linked to the new vertex.

Example Script

FIGS. 13A-13B, 14A-14B, 15, and 16A-16B, and show examples of script according to the disclosed technologies. FIGS. 13A-13B show script 1300 of an example synthesis function syn( ) according to the disclosed technologies, which can add one or more child nodes to a parent node. Constructor Syn( ) defined at line 1363 receives the parent node as argument $0, and (using JavaScript's permissive parameter passing syntax) one or more child nodes as arguments $1, $2, etc. Syn( ) can create key-values for the synthesized child node. In the body of the syn( ) script, at line 1350, the child nodes can be constructed by a call to Syn( ) and attached to the tree data structure by a call to tie( ), described further herein. At line 1353, the parent key-values can be updated for each constructed child, following which the parent handle can be returned at line 1358.

The following support functions can operate in the order described. At line 1359, Syn( ) can create metadata key-values for the syn( ) parent node. At line 1327, feedback( ) can notify with log( ) if the child node or the parent node does not conform with namespace rules of the present application. Finally, at line 1335, update( ) can check if the key-value in the parent node is modifiable, and can apply the changes to the parent node.

FIGS. 14A-14B show script 1400 of an example linking function tie( ) according to the disclosed technologies, which can link a child node, represented as argument $3 of constructor Tie( ) at line 1477, to a parent node represented as argument $1. The argument $0 can specify a scope to disambiguate the parent argument $1. Tie( ) can create key-values for the tie( ) child node.

The following support functions can operate in the order described. At line 1470, Tie( ) can create metadata key-values for the tie( ) parent node. At line 1417, put( ) can apply key-value changes to a node. At line 1451, Meta( ) can create timestamp metadata for the parent node and child node. At line 1454, MetaGlobal( ) can create metadata for the parent node. Finally, at line 1463, MetaLocal( ) can create metadata for the child node.

In the body of the tie( ) script, metadata can be added to the parent node at lines 1428-1429 with calls to put( ) and Tie( ). This metadata can include key-values identifying the child node. At lines 1432-1450, metadata can be added to the child node with calls to put( ), Meta( ), MetaLocal( ), and MetaGlobal( ). The MetaGlobal( ) call provides parent metadata to be included in the child node. The child node can be created in syn( ) prior to invocation of tie( ).

Figure 15:
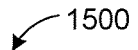
FIG. 15 shows script of an example child script module according to the disclosed technologies.

FIG. 15 shows portions of an example child script module 1500. In this example, the child node stores a question answer pair (Lines 1551, 1552) of an educational quiz application as data properties in a JSON file. The quiz application can have a tree data structure rooted at a node named rootQuiz. The JSON file is named according to the timestamp at which it was created, 2020-01-21T19-56-13.195Z.json, and is organized within a child_1 folder in a hierarchical directory structure at ./rootQuiz/parent/child_1/. Lines 1551-1559 illustrate data properties of this node, including the application specific question-answer pair at lines 1551-1552, and data properties associated with the tree database infrastructures, such as a filesystem address (i.e. fully qualified folder name for this file) at line 1553, and a data structure $0 indicating the time of creation (lines 1555-1556), the relative namespace address #1 of the present child at line 1557, and a containing scope "rootQuiz-.parent" for the present node at line 1558. In this example, the scope can serve as a link back to the parent node, however a link from child to parent is not a requirement.

Successive children added to the same parent can have namespace addresses #2, #3, and so forth, and the respective script files could be stored in folders child_2, child_3, and so forth.

In this example, function properties are stored in a JavaScript file, named according to a time of creation as 2020-01-21T19-56-13.182Z.js. Line 1520 illustrates an application-specific function property isAnswerCorrect( ) which can take a user's answer (argument $0) and return a Boolean true/false if the user's answer matches the answer data property stored at line 1552. Line 1530 illustrates an infrastructure function property to get the parent of this child node. These function properties are merely exemplary.

Figure 16A:
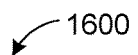
FIGS. 16A-16B show script of an example parent script module according to the disclosed technologies.
Figure 16B:
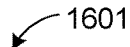

FIGS. 16A-16B show portions of an example parent script module according to the disclosed technologies. In this example, the parent node stores a question of the educational quiz application as a data property in a JSON file. The JSON file is named according to the timestamp at which it was created, and is organized within a parent folder in a directory ./rootQuiz/parent/. The parent node stores its function properties in a JavaScript (.js) file named similarly and in the same folder.

FIG. 16A illustrates the parent script module 1600 after creation of first child node (child_1) and before creation of second child node (child 2), while FIG. 16B illustrates the parent script module 1601 after creation of child 2. Starting with FIG. 16A, the data properties include metadata associated with the parent node tree infrastructure as $0 at lines 1651-1656, including a timestamp (line 1652), a relative namespace address (#1 at line 1653, for sole parent under the rootQuiz node), a containing scope "rootQuiz" for the present node (line 1654), and number of child nodes (presently 1 at line 1655). The data properties also include application specific data, which is the question associated with the child_1 node at line 1658, and a namespace address of the child node at line 1659, which is a link to the child node. The JSON file timestamp can match the timestamps of the child node files in FIG. 15.

Turning to FIG. 16B, the JSON file can be updated or replaced when child_2 is added. Lines 1670-1685 show the new or updated file. As illustrated, the number of children (line 1675) has been updated, and data properties for child_2 have been added (lines 1682-1683). The new or updated JSON file has a new timestamp (the filename and line 1672).

FIGS. 16A-16B also illustrate function properties of the parent node, stored in a JavaScript file, named according to time of creation as 2020-01-21T19-25-23.218Z.js in the parent directory. Line 1630 illustrates an application-specific function property displayPrompt( ) which can display the question specified by its $0 argument to a user. Line 1620 illustrates an infrastructure function property to make a child with argument(s) specified by its $0 argument. In some examples, the function makeChild( ) can use the kernel functions syn( ) and tie( ) as described herein, as well as fs.writeFile( ) and related functions provided in a Node.js environment. These function properties can be run in response to corresponding distinct event types, and are merely exemplary. As indicated in FIG. 16B, the function properties of the parent node can remain unchanged when child_2 is added.

In some examples, prototypes of scripts for tree nodes, including data properties or function properties of one or more types of nodes, can be provided in a seed file, or as part of application logic.

Example Features and Variations

Purge

Any database can become congested over time. The disclosed technologies support multiple ways of culling stale or unneeded data to avoid bloat. In a first example, a console command similar to "purge Jan. 1, 2019" can be routed to a maintenance event handler within a tree data structure, which can systematically traverse the tree and delete nodes having timestamps preceding the specified date, which is Jan. 1, 2019 in the example. To prevent required nodes (such as event handlers, routing nodes, or nodes defining scope) from being deleted, such nodes can be flagged "Permanent" to prevent their deletion. Alternatively, purging can be restricted to leaf nodes of a tree, so that a node can only be deleted if the entire subtree beneath it meets the purge criterion.

In a second example, certain nodes can monitor their own number of children (or, the size of the subtrees beneath the monitoring nodes), and trigger a purge when the number or size exceeds a threshold. The nodes selected for deletion can be the oldest among the children or subtree, or least-recently-used, or can be selected according to another criterion.

Finally, a database can be purged by a reset event, responsive to which a tree data structure can be deleted and restarted (initialized) by invoking a boot module such as 148.

Embodiments not Limited to JavaScript

A number of features described herein have been developed in a JavaScript context, subject to the constraints of JavaScript, JSON, or Nodejs. For example, JavaScript natively provides a single global namespace, and it is incumbent on an application to organize its namespace(s) to avoid collisions. However, the use of JavaScript is not a requirement, and other environments can be used. In such environments, some techniques proposed herein can be inappropriate or unnecessary, and other equivalent techniques can be used within the scope of the disclosed technologies. Similar considerations can apply to examples using JavaScript, as the language and related facilities evolve over future releases.

Namespace

A tree architecture can have multiple similar nodes to be instantiated as children of a given parent node, and these child nodes can have similarly named function or data properties. Accordingly, namespace organization can be structured to prevent collisions.

First, sequential node labels can be used to distinguish child nodes of a given parent node. With reference to FIG. 3, and presuming that the children of parent node 331 were added in the order 341 (first), 343, 345, then these children can be addressed as #1, #2, #3 respectively, relative to parent node 331. Thus, node 342 can be addressed as ⟨A331⟩.⟨#2⟩, where A331 denotes the namespace address of node 331, which in turn can be of the form ⟨A321⟩.⟨#1⟩, because node 331 is the first child of grandparent node 321. While sequential labels have an advantage of transparency, other unique child labels can be used, such as descriptive labels or hash values.

Second, a scope identifier can be used to qualify a node name. With reference to FIG. 9, nodes 931, 935 can be instantiated using the same application logic and can have the same name "Call_Event_Handler". Each can have a first child named "Call" or designated sequentially as "#1". However, nodes 931, 935 are within different scopes of Tree-1 and Tree-2. Accordingly, ambiguous references ⟨"Call_Event_Handler"⟩ or ⟨"Call_Event_Handler"⟩.⟨"#1"⟩ can be disambiguated with a ⟨Scope⟩ prefix, thus ⟨Tree-1⟩.⟨"Call_Event_Handler"⟩ and ⟨Tree-2⟩.⟨"Call-_Event_Handler"⟩ are disambiguated. As described herein, a scope identifier can be an explicitly defined scope, or can be implicitly defined by an identifier of an ancestor (parent, grandparent, etc.) of an instant node.

Third, fully qualified namespace addresses can be used. For example, node 941C can be designated as ⟨A911⟩.⟨A921⟩.⟨A931⟩.⟨#3⟩ or ⟨A911⟩.⟨#2⟩.⟨A931⟩.⟨#3⟩, where again A911 denotes the namespace address of node 911 and so forth. The namespace address of root node 911 can be a uniquely declared name within the environment. For example, root node 911 can have name "Root Tree-1" and root node 912 can have name "Root Tree-2". The namespace addresses of other nodes can be local names (e.g. node 931 can have a local name "Call_Event_Handler") or sequential child identifiers (e.g. node 931 would be #1 as first child of routing node 921). In examples, nodes can also be assigned globally unique names such as "John's_answering_machine_handler". Various such node addresses can be used interchangeably within a fully qualified namespace address. The number of fields in a fully qualified namespace address of a given node can be equal to the depth of the given node in its tree.

DNS Extension

Fully qualified namespace addresses allow an extension of Domain Name System (DNS) technology to be employed for resolution of nodes and their data or function properties. Where DNS can resolve a fully qualified domain name to an Internet Protocol (IP) address, a fully qualified namespace address can be resolved to an associated URL, UUID, or other linked document. As an example, a song node at level 4 of a music database can have a fully qualified namespace address ⟨Root⟩.⟨L2⟩.⟨L3⟩.⟨Song⟩, where ⟨Root⟩ identifies the root node of a song database, ⟨Song⟩ can be for example the title of a particular song, and ⟨L2⟩, ⟨L3⟩ denote intervening nodes between the root and the song node. Then, ⟨Root⟩.⟨L2⟩.⟨L3⟩.⟨Song⟩ can be resolved to a URL that plays a recording of the song. This URL can be a data property of the song node. The dotted notation is similar to notation for internet domains.

Graphs

While some embodiments are described as tree data structures, this is not a requirement of the disclosed technologies. Other connected data structures can be used. A connected data structure is a data structure that can be represented as a graph. One or more nodes (i.e. vertices) of such a graph can incorporate script definitions of function properties and data properties of the node, as described herein.

Concurrent Processes and Non-Blocking Calls

Some environments can support concurrent processes. In some examples, concurrent processes can have conflicts, either by concurrently seeking to modify a common portion of a tree data structure or through concurrent access to a non-shareable resource of the environment. Locks can be used to avoid conflict. Some environments can support non-blocking calls, in which a calling process can continue execution before a called function completes. In some examples, processes can be forced to wait for called function to complete, in order to avoid side effects and improve program transparency.

Privacy

As discussed herein, script can be self-explanatory, and can provide readability and transparency, leading to increases in trust and security. However, in some situations, there can be a competing interest to maintain privacy. Accordingly, in some examples, script can be maintained in encrypted form, so that the script is transparent to anyone in possession of a decryption key, while opaque to others. Multiple encryption keys can be deployed within a single environment. For example, in a multi-user communication environment, a given user (e.g. User-1) can be given keys to their own tree database and other associated functions called from their tree database, but can be restricted from viewing other users' trees. In a music application, access can be controlled according to role. Thus, a songwriter or artist can have access to documents applicable to their own work, but can be restricted from viewing details pertinent only to the work of others. A music playing entity (such as an internet or broadcast radio station or network of such stations) can have access to a music catalog and negotiated terms between the music playing entity and the catalog distributor, but can be restricted from viewing terms between the distributor and individual artists.

Audio Events

In some examples, events can be triggered by audio. An audio event can be processed by a remote speech-to-text service to return text similar to conventional keyboard input for a console event, or other types of events. External artificial intelligence can also be applied to classify the event type of an audio input, or to distinguish an audio event from background audio. The audio can be a voice command, but is not limited to voice. Other example audio events can be a ringing doorbell, a baby crying, or a song playing on a radio. Some audio events can be received at a microphone, digitized, and routed as any other event. Other audio events can be received as a digitized audio signal over a network, for example in broadcast media, streaming media, or a telephone call.

Cascaded Events

In some examples, a first event handled by a first node of a tree data structure can cause a second (internal) event which is in turn processed by the same or a different node.

In further examples, two second events can be generated and handled concurrently (e.g. in parallel) or sequentially. A second event can generate a third event, and so on. A tree data structure can be initialized by a cascade of events beginning with execution of a seed function or script. Still further, an entire tree data structure can be generated as a cascade from a single event triggering initialization of the tree data structure, creation of a root node of the tree data structure, or execution of a function property of the root node.

A Generalized Computer Environment

Figure 17:
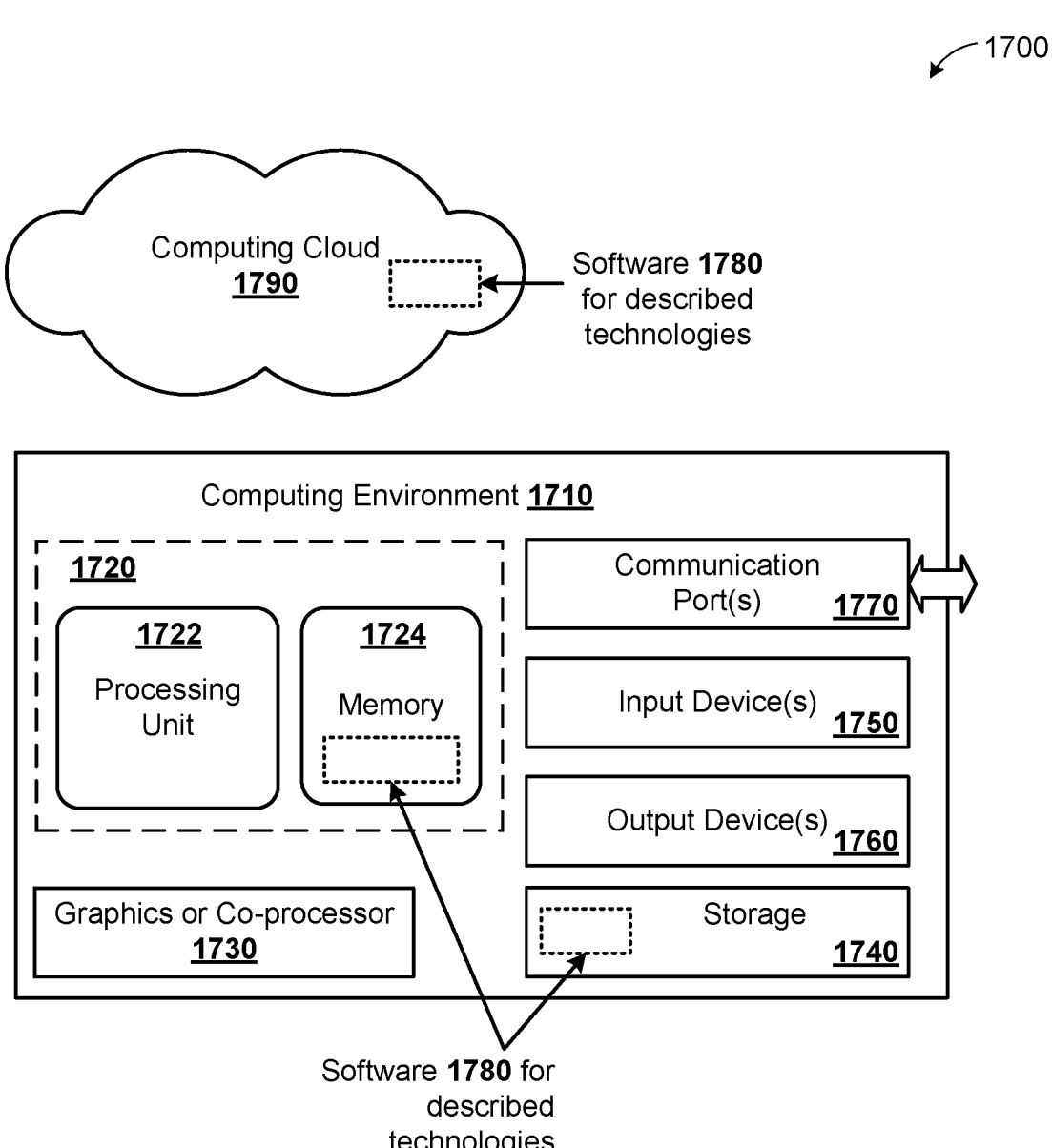
FIG. 17 is a diagram schematically depicting a computing environment suitable for implementation of disclosed technologies.

FIG. 17 illustrates a generalized example of a suitable computing system 1700 in which described examples, techniques, and technologies can be implemented, including configuration, deployment, operation, or maintenance of script data structures and related software. The computing system 1700 is not intended to suggest any limitation as to scope of use or functionality of the present disclosure, as the innovations can be implemented in diverse general-purpose or special-purpose computing systems.

With reference to FIG. 17, computing environment 1710 includes one or more processing units 1722 and memory 1724. In FIG. 17, this basic configuration 1720 is included within a dashed line. Processing unit 1722 executes computer-executable instructions, such as for implementing components of a software architecture for a script database or application, any of the methods described herein, or various other architectures, components, data structures, handlers, managers, modules, or nodes described herein. Processing unit 1722 can be a general-purpose central processing unit (CPU), a processor in an application-specific integrated circuit (ASIC), or any other type of processor. In a multi-processing system, multiple processing units execute computer-executable instructions to increase processing power. Computing environment 1710 can also include a graphics processing unit or co-processing unit 1730. Tangible memory 1724 can be volatile memory (e.g., registers, cache, or RAM), non-volatile memory (e.g., ROM, EEPROM, or flash memory), or some combination thereof, accessible by processing units 1722, 1730. The memory 1724 stores software 1780 implementing one or more innovations described herein, in the form of computer-executable instructions suitable for execution by the processing unit(s) 1722, 1730.

A computing system 1710 can have additional features, such as one or more of storage 1740 (representing e.g. storage for script modules, calibration data, configuration data, application data, state information, or related files, for one or more tree data structures as described herein), input devices 1750, output devices 1760, or communication ports 1770. An interconnection mechanism (not shown) such as a bus, controller, or network interconnects the components of the computing environment 1710. In some examples, operating system software (not shown) provides an operating environment for other software executing in the computing environment 1710, and coordinates activities of the components of the computing environment 1710.

The memory 1724 or storage 1740 can also store acquired or calculated data, including measurements, readings, or statistics of a moisture meter. The memory 1724 or storage 1740 can also store some or all of a configuration file, an auxiliary input file, and/or other configuration and operational data. The tangible storage 1740 can be removable or non-removable, and includes flash memory, magnetic disks, magnetic tapes or cassettes, CD-ROMs, DVDs, or any other medium which can be used to store information in a non-transitory way and which can be accessed within the computing environment 1710. The storage 1740 stores instructions of the software 1780 (including instructions and/or data) implementing one or more innovations described herein.

The input device(s) 1750 can be a mechanical, touch-sensing, or proximity-sensing input device such as a push-button, keypad, keyboard, mouse, pen, touchscreen, or trackball, a voice input device, a scanning device, or another device that provides input to the computing environment 1710. The output device(s) 1760 can be a display, indicator lamp, printer, speaker, optical disk writer, or another device that provides output from the computing environment 1710.

The communication port(s) 1770 enable communication over a communication medium to another computing entity. The communication medium conveys information such as computer-executable instructions, audio or video input or output, calibration data, readings, alerts, notifications, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1700 can also include a computing cloud 1790 in which instructions implementing all or a portion of the disclosed technology can be executed. Any combination of memory 1724, storage 1740, and computing cloud 1790 can be used to store software instructions and data of the disclosed technologies. A local or datacenter computing environment 1710 can utilize the computing cloud 1790 to obtain computing services and perform computing operations (e.g., data processing, data storage, and the like).

In some examples, software embodiments of the disclosed technologies can be deployed on a smartphone, tablet, portable or fixed computer, single-board computer (e.g. Raspberry Pi, Arduino), television set, memory card, memory stick, or a handheld remote control device.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computer", "computer system", "computing environment", "computing device", and similar terms are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in one or another form of physical computer hardware.

General Considerations

As used in this disclosure, the singular forms "a", "an", and "the" include the plural forms unless the context clearly dictates otherwise. Additionally, the terms "includes" and "incorporates" mean "comprises". Further, the term "coupled" encompasses mechanical, electrical, magnetic, optical, wireless, as well as other practical ways of coupling or linking items together, and does not exclude the presence of intermediate elements between the coupled items. Furthermore, as used herein, the terms "or" or "and/or" mean any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access", "acquire", "add", "apply", "calculate", "check", "compare", "compute", "decrypt", "define", "determine", "display", "encrypt", "evaluate", "execute", "follow", "form", "format", "generate", "incorporate", "initiate", "input", "instantiate", "invoke", "link", "load", "maintain", "modify", "output", "pass", "process", "provide", "receive", "retrieve", "select", "store", "synthesize", "tie", "transmit", "traverse", "trigger", "update", and "use" to denote actual operations that are performed by or managed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 17, computer-readable storage media include memory 1724, and storage 1740. The terms computer-readable storage media or non-volatile memory do not include signals and carrier waves. In addition, the terms computer-readable storage media or non-volatile memory do not include communication ports (e.g., 1770) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in script languages and notation such as JavaScript, JSON, AWK, Bash, CSS, Eiffel, Emacs Lisp, HTML, J, Julia, Lua, Matlab, Perl, PHP, PowerShell, Python, R, Ruby, SAS, Sed, Tcl, thinBasic, VBScript, Visual Basic for Applications, XML, or other interpreted languages, markup languages, scripting languages, or glue languages, with suitable interpreters. Other portions of the disclosed technology can be written in languages such as Adobe Flash, assembly language, B #, C, C++, C #, Curl, Dart, Fortran, Haskell, Java, Lisp, Octave, Rust, SQL, WebAssembly, any derivatives thereof, or any other suitable programming language, or any combination of suitable languages, libraries, packages, or scripts. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

I claim:

1. A method comprising:
   executing a first script, by a first interpreter, of a first function property of a parent vertex in a tree data structure, wherein executing the first script of the first function property comprises:
   receiving a first event from an interface indicating insertion of a data item identified by the first event into the tree data structure;
   instantiating a child vertex of the tree data structure to hold the data item;
   incorporating the data item as a data property in the child vertex; and
   passing identifiers of the child vertex and the parent vertex to a kernel function;
   wherein the tree data structure has one root vertex, and every other vertex of the tree data structure has a corresponding unique parent vertex traceable to the root vertex;
   using the kernel function:
   adding metadata to the parent vertex and the child vertex to link the parent vertex and the child vertex within the tree data structure; and
   executing a second script, by a second interpreter, of a second function property of the parent vertex, distinct from the first function property, wherein executing the second script of the second function property comprises:
   receiving a second event from the interface indicating a query on the tree data structure;
   reading the data item from the linked child vertex; and
   responding to the query.

2. The method of claim 1, further comprising:
incorporating a child script in the child vertex.

3. The method of claim 2, further comprising:
storing the data item and the child script in distinct files.

4. The method of claim 1, further comprising:
maintaining data of a communication appliance in the tree data structure.

5. The method of claim 4, wherein the receiving of the event comprises receiving an incoming communication or a request to initiate an outgoing communication.

6. The method of claim 4, further comprising:
receiving a third event corresponding to a search function; and
responsive to the second event:
   traversing the tree data structure to obtain a search result; and
   transmitting the search result.

7. The method of claim 1, wherein the tree data structure maintains data of a document.

8. The method of claim 7, wherein:
the tree data structure is a first tree data structure; and
the method further comprises:
   receiving a third event corresponding to a query on the first tree data structure; and
   responsive to the third event, following a link from the first tree data structure to a second tree data structure representing a reference linked to the document.

9. The method of claim 7, wherein the first or second event comprises a notification of a first external occurrence to which the document is applicable, and the method further comprises:

responsive to the notification, initiating a second external occurrence.

10. A method of updating a tree database comprising a tree data structure comprising a plurality of vertices, in which portions of a document having associated entities are stored at respective ones of the vertices, the method comprising:

receiving a first event at a first event handler vertex among the vertices in the tree data structure, wherein the first event handler vertex comprises a first script, and the first event is accompanied by a data item which is one or more of: a definition of a term in the document, an identification of a new entity to be added to the associated entities, or a notification of an external occurrence to be logged with the document;

adding a new vertex to the tree database as a child of the first event handler vertex, the new vertex comprising a second script in which the data item is defined as a data property, wherein adding the new vertex comprises executing the first script by a first interpreter; and updating metadata of the event handler vertex to link the first event handler vertex to the new vertex;

receiving a second event at a second event handler vertex comprising a third script, wherein the first and second event handler vertices are in different branches of the tree data structure; and responsive to the received second event, executing the third script by a second interpreter.

11. One or more non-transitory computer-readable storage media storing:

a first script, comprising first instructions, of a first function property of a parent vertex in a tree data structure; wherein execution of the first script of the first function property, by a first interpreter on one or more hardware processors, causes the one or more hardware processors to:

receive a first event from an interface indicating insertion of a data item identified by the first event into the tree data structure;

instantiate a child vertex of the tree data structure to hold the data item;

incorporate the data item as a data property in the child vertex; and pass identifiers of the child vertex and the parent vertex to a kernel function;

wherein the tree data structure has one root vertex, and every other vertex of the tree data structure has a corresponding unique parent vertex traceable to the root vertex;

a kernel function comprising second instructions, wherein execution of the second instructions on the one or more hardware processors causes the one or more hardware processors to:

add metadata to the parent vertex and the child vertex to link the parent vertex and the child vertex within the tree data structure; and a second script, comprising third instructions, of a second function property of the parent vertex, distinct from the first function property; wherein execution of the second script of the second function property, by a second interpreter on the one or more hardware processors, causes the one or more hardware processors to:

receive a second event from the interface indicating a query on the tree data structure;

read the data item from the linked child vertex; and respond to the query.

12. The one or more non-transitory computer-readable storage media of claim 11, further storing fourth instructions which, when executed, cause maintenance of data of a communication appliance in the tree data structure.

13. The one or more non-transitory computer-readable storage media of claim 12, wherein the receiving of the first event comprises receiving an incoming communication or a request to initiate an outgoing communication.

14. The one or more non-transitory computer-readable storage media of claim 11, further storing fifth instructions, wherein the tree data structure is a first tree data structure maintaining data of a document, and wherein execution of the fifth instructions causes:

a third event to be received, the third event corresponding to a query on the tree data structure; and responsive to the third event, a link to be followed from the tree data structure to another tree data structure representing a reference linked to the document.

\* \* \* \* \*